(12) United States Patent
Ito et al.

(10) Patent No.: US 11,860,346 B2
(45) Date of Patent: *Jan. 2, 2024

(54) LENS, ZOOM LENS, AND IMAGING LENS

(71) Applicant: FUJIFILM Corporation, Tokyo (JP)

(72) Inventors: Kenji Ito, Saitama (JP); Toshio Sasaki, Saitama (JP); Masayasu Konishi, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 290 days.

This patent is subject to a terminal disclaimer.

(21) Appl. No.: 17/355,212

(22) Filed: Jun. 23, 2021

(65) Prior Publication Data

US 2021/0325646 A1 Oct. 21, 2021

Related U.S. Application Data

(63) Continuation of application No. 16/547,608, filed on Aug. 22, 2019, now Pat. No. 11,079,576, which is a
(Continued)

(30) Foreign Application Priority Data

Feb. 24, 2017 (JP) .................................. 2017-034074
Jan. 23, 2018 (JP) .................................. 2018-009060

(51) Int. Cl.
*G02B 15/167* (2006.01)
*G02B 3/02* (2006.01)
(Continued)

(52) U.S. Cl.
CPC ............. *G02B 15/167* (2013.01); *G02B 3/02* (2013.01); *G02B 13/18* (2013.01); *G02B 15/15* (2013.01); *G02B 27/0025* (2013.01)

(58) Field of Classification Search
CPC ...... G02B 27/0025; G02B 13/18; G02B 3/02; G02B 15/15; G02B 15/163; G02B 15/167
See application file for complete search history.

(56) References Cited

U.S. PATENT DOCUMENTS 2,959,105 A * 11/1960 Sayanagi ............... G02B 27/46
355/71
4,871,242 A * 10/1989 Sousa .................. G02B 3/0043
359/707
(Continued)

FOREIGN PATENT DOCUMENTS

GB 2266782 A * 11/1993 ............. G02B 13/20
JP S63214715 9/1988
(Continued)

OTHER PUBLICATIONS

Spherical Lenses, 2009, pp. 1-13 [online], [retrieved May 23, 2023], retrieved from the Internet (URL: http://physicsinsights.org/simple_optics_spherical_lenses-1.html >. (Year: 2009).*
(Continued)

*Primary Examiner* — Ephrem Z Mebrahtu
*Assistant Examiner* — Wesley Scott Ashton
(74) *Attorney, Agent, or Firm* — JCIPRNET

(57) ABSTRACT

A lens 1 has unevenness within an optical effective diameter D of an optical surface 2, an arithmetic mean roughness Ra within the optical effective diameter D of the optical surface 2 is 20 nm or more and 50 nm or less, and an average value of widths W of protrusion portions 3 of the unevenness on an average line C2 of a roughness curve C1 of the optical surface 2 is 1/200 or more and 1/50 or less of the optical effective diameter D of the optical surface 2. The lens 1 is suitably used as a lens that composes a zoom lens or an imaging lens.

20 Claims, 12 Drawing Sheets

Related U.S. Application Data continuation of application No. PCT/JP2018/005873, filed on Feb. 20, 2018.

(51) Int. Cl.
  *G02B 13/18* (2006.01)
  *G02B 15/15* (2006.01)
  *G02B 27/00* (2006.01)

(56) References Cited

U.S. PATENT DOCUMENTS

| | | | | |
|---|---|---|---|---|
| 5,177,637 | A * | 1/1993 | Tsukada | G03B 13/24 396/150 |
| 6,073,851 | A | 6/2000 | Olmstead et al. | |
| 6,819,491 | B2 * | 11/2004 | Takahashi | G02B 27/4238 359/566 |
| 7,619,821 | B2 * | 11/2009 | Yamada | G02B 1/118 359/581 |
| 8,279,526 | B2 * | 10/2012 | Momoki | G03B 11/00 359/599 |
| 8,305,687 | B2 * | 11/2012 | Ryu | G02B 27/646 359/557 |
| 9,829,771 | B2 * | 11/2017 | Ueno | G03B 17/08 |
| 11,079,576 | B2 * | 8/2021 | Ito | G02B 15/167 |
| 2003/0184875 | A1 | 10/2003 | Mihara et al. | |
| 2006/0158972 | A1 | 7/2006 | Kimura | |
| 2010/0194928 | A1 * | 8/2010 | Amanai | G02B 15/1461 359/683 |
| 2010/0226016 | A1 | 9/2010 | Hirauchi et al. | |
| 2015/0062712 | A1 | 3/2015 | Tazawa et al. | |
| 2015/0138336 | A1 | 5/2015 | Ueno et al. | |
| 2015/0168610 | A1 * | 6/2015 | Fukui | B29C 33/3842 249/117 |
| 2016/0245955 | A1 | 8/2016 | Eguchi et al. | |
| 2016/0266350 | A1 * | 9/2016 | Iiyama | G02B 15/145115 |
| 2017/0052288 | A1 * | 2/2017 | Ludemann | G02B 27/0025 |
| 2017/0315271 | A1 | 11/2017 | Kahara et al. | |

FOREIGN PATENT DOCUMENTS

| | | | |
|---|---|---|---|
| JP | H01147403 | 6/1989 | |
| JP | 2007099598 A * | 4/2007 | C03B 11/086 |
| JP | 2007233002 | 9/2007 | |
| JP | 2010101919 | 5/2010 | |
| JP | 2012098595 | 5/2012 | |
| WO | 2014171513 | 10/2014 | |
| WO | 2016068297 | 5/2016 | |

OTHER PUBLICATIONS

Surftest (Surface Roughness Testing), 2010, pp. 1-2 [online], [retrieved May 22, 2023], retrieved from the Internet <URL: https://www2.mitutoyo.co.jp/eng/products/menu/QuickGuide_Surftest.pdf>. (Year: 2010).*

Harinderpal Singh et al., Analysis of Surface Roughness and Waviness During Diamond Turning of Polycarbonate, 2 International Journal of Scientific Research 268-270 (2013). (Year: 2013).*

Photographic Lenses—Methods for the Measurement of the Effective Aperture, F-number and Relative Aperture, 2017, pp. 1-20 [online], [retrieved May 22, 2023], retrieved from the Internet <URL: https://kikakurui.com/b7/B7095-1997-01.html >. (Year: 2017).*

Richard Juergens, Designing Optical Systems, 2018, pp. 1-60 [online], [retrieved May 23, 2023], retrieved from the Internet <URL: https://wp.optics.arizona.edu/jsasian/wp-content/uploads/sites/33/2018/11/RJ-2018-Opti-517-Designing-Optical-Systems.pdf>. (Year: 2018).*

Dave Etchells, The End of Onion-ring Bokeh! Panasonic Beats the Curse of Aspheric Lenses, 2014, pp. 1-9 [online], [retrieved Sep. 11, 20231], retrieved from the Internet <URL: https://www.imaging-resource.com/news/2014/05/02/the-end-of-onion-ring-bokeh-panasonic-beats-the-curse-of-aspheric-lenses>. (Year: 2014).*

Viktor P. Sivokon et al., Theory of Bokeh Image Structure in Camera Lenses with an Aspheric Surface, 53 Optical Engineering 065103-1 to 065102-18 (2014). (Year: 2014).*

Tayyab Suratwala et al., Mechanism and Simulation of Removal Rate and Surface Roughness During Optical Polishing of Glasses, 99 Journal of the American Ceramic Society 1974-1984 (2016). (Year: 2016).*

FE 24-70mm F2.8 GM, 2017 (English Version), pp. 1-10 [online], [retrieved Sep. 11, 2023], retrieved from the Internet <URL: https://www.sony.jp/ichigan/products/SEL2470GM/feature_1.html>. (Year: 2017).*

Capa Camera Net, "Yamagata factory report, Commitment to manufacturing with high precision lens processing", Feb. 16, 2017, Available at: "http://capacamera.net/gmuseum/special/1301_2.html".

Dave Etchells, "The end of onion-ring bokeh? Panasonic beats the curse of aspheric lenses", Imaging Resource, May 2, 2014, Available at: "https://www.imaging-resource.com/news/2014/05/02/the-end-of-onion-ring-bokeh-panasonic-beats-the-curse-of-aspheric-lenses".

Sony Marketing Co., "SEL2470GM Features, A total of three aspheric lenses including the newly developed ultra-high aspheric XA (extreme aspherical) lenses are effectively arranged to realize sharp depiction from aperture opening", Aug. 13, 2019, Available at: "https://www.sony.jp/ichigan/products/SEL2470GM/feature_1.html".

"International Search Report (Form PCT/ISA/210) of PCT/JP2018/005873", dated Apr. 17, 2018, with English translation thereof, pp. 1-5.

"Written Opinion of the International Searching Authority (Form PCT/ISA/237) of PCT/ JP2018/005873", dated Apr. 17, 2018, with English translation thereof, pp. 1-6.

* cited by examiner

FIG. 3

| | PROCESSING DEPTH | AREA RATIO BETWEEN RANDOM PROCESSED PORTION AND UNPROCESSED PORTION | AVERAGE VALUE OF WIDTHS OF PROTRUSION PORTIONS $W_{AVG}$ (mm) | $W_{AVG}/D$ (D = 58 mm) | STANDARD DEVIATION OF WIDTHS OF PROTRUSION PORTIONS $W_{SD}$ (D = 58 mm) | $W_{SD}/D$ (D = 58 mm) | Ra (nm) | BLURRED IMAGE | BLURRED IMAGE EVALUATION RESULT |
|---|---|---|---|---|---|---|---|---|---|
| EXPERIMENT EXAMPLE 1 (UNPROCESSED) | 0 | – | 0.0 | 0 | 0 | 0 | 9.5 | 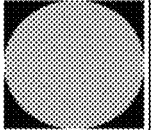 | C |
| EXPERIMENT EXAMPLE 2 | 10 | 0.6 | 2.9 | 1/20 | 0 | 0 | 10 | 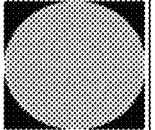 | C |
| EXPERIMENT EXAMPLE 3 | 20 | 0.6 | 0.6 | 1/100 | 0 | 0 | 11.5 | 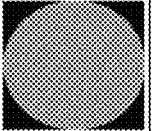 | C |
| EXPERIMENT EXAMPLE 4 | 10 | 0.6 | 0.1 | 1/500 | 0 | 0 | 10 | 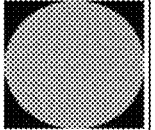 | C |
| EXPERIMENT EXAMPLE 5 | 40 | 0.6 | 2.9 | 1/20 | 0 | 0 | 20 | 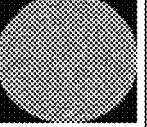 | C |
| EXPERIMENT EXAMPLE 6 | 40 | 0.6 | 1.2 | 1/50 | 0 | 0 | 20 | 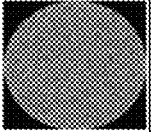 | A |
| EXPERIMENT EXAMPLE 7 | 40 | 0.6 | 0.6 | 1/100 | 0 | 0 | 20 | 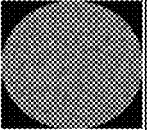 | A |
| EXPERIMENT EXAMPLE 8 | 40 | 0.6 | 0.3 | 1/200 | 0 | 0 | 20 | 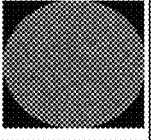 | B |
| EXPERIMENT EXAMPLE 9 | 40 | 0.6 | 0.1 | 1/500 | 0 | 0 | 20 | 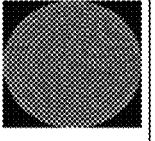 | C |

FIG. 4

| | PROCESSING DEPTH | AREA RATIO BETWEEN RANDOM PROCESSED PORTION AND UNPROCESSED PORTION | AVERAGE VALUE OF WIDTHS OF PROTRUSION PORTIONS $W_{AVG}$ (mm) | $W_{AVG}/D$ (D = 58 mm) | STANDARD DEVIATION OF WIDTHS OF PROTRUSION PORTIONS $W_{SD}$ (D = 58 mm) | $W_{SD}/D$ (D = 58 mm) | $R_a$ (nm) | BLURRED IMAGE | BLURRED IMAGE EVALUATION RESULT |
|---|---|---|---|---|---|---|---|---|---|
| EXPERIMENT EXAMPLE 10 | 60 | 0.6 | 2.9 | 1/20 | 0 | 0 | 28.4 | 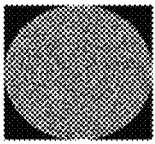 | C |
| EXPERIMENT EXAMPLE 11 | 60 | 0.6 | 1.2 | 1/50 | 0 | 0 | 29.2 | 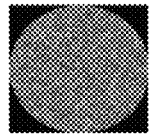 | A |
| EXPERIMENT EXAMPLE 12 | 60 | 0.6 | 0.6 | 1/100 | 0 | 0 | 30 | 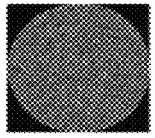 | A |
| EXPERIMENT EXAMPLE 13 | 60 | 0.6 | 0.3 | 1/200 | 0 | 0 | 26.1 | 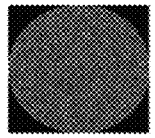 | B |
| EXPERIMENT EXAMPLE 14 | 60 | 0.6 | 0.1 | 1/500 | 0 | 0 | 29.3 | 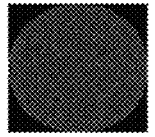 | C |
| EXPERIMENT EXAMPLE 15 | 100 | 0.6 | 2.9 | 1/20 | 0 | 0 | 50 | 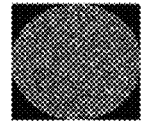 | C |
| EXPERIMENT EXAMPLE 16 | 100 | 0.6 | 1.2 | 1/50 | 0 | 0 | 50 | 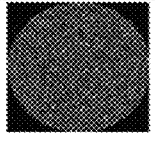 | A |
| EXPERIMENT EXAMPLE 17 | 100 | 0.6 | 0.6 | 1/100 | 0 | 0 | 50 | 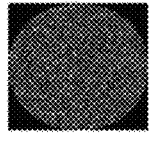 | A |
| EXPERIMENT EXAMPLE 18 | 100 | 0.6 | 0.3 | 1/200 | 0 | 0 | 50 | 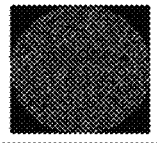 | A |

FIG. 5

| | PROCESSING DEPTH | AREA RATIO BETWEEN RANDOM PROCESSED PORTION AND UNPROCESSED PORTION | AVERAGE VALUE OF WIDTHS OF PROTRUSION PORTIONS $W_{AVG}$ (mm) | $W_{AVG}/D$ (D = 58 mm) | STANDARD DEVIATION OF WIDTHS OF PROTRUSION PORTIONS $W_{SD}$ (D = 58 mm) | $W_{SD}/D$ (D = 58 mm) | Ra (nm) | BLURRED IMAGE | BLURRED IMAGE EVALUATION RESULT |
|---|---|---|---|---|---|---|---|---|---|
| EXPERIMENT EXAMPLE 19 | 100 | 0.6 | 0.1 | 1/500 | 0 | 0 | 50 | 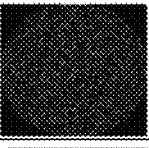 | C |
| EXPERIMENT EXAMPLE 20 | 200 | 0.6 | 2.9 | 1/20 | 0 | 0 | 100 | 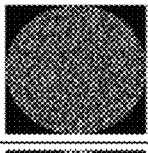 | A |
| EXPERIMENT EXAMPLE 21 | 200 | 0.6 | 0.6 | 1/100 | 0 | 0 | 96 | 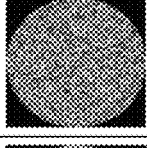 | A |
| EXPERIMENT EXAMPLE 22 | 200 | 0.6 | 0.1 | 1/500 | 0 | 0 | 96 | 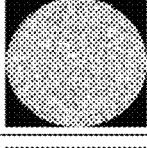 | A |
| EXPERIMENT EXAMPLE 23 | 60 | 0.6 | 0.7 | 1/90 | 0.2 | 1/300 | 28.6 | 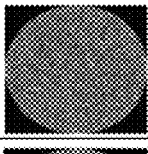 | A |
| EXPERIMENT EXAMPLE 24 | 60 | 0.6 | 1.2 | 1/50 | 0.4 | 1/154 | 26.5 | 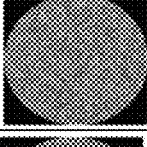 | B |
| EXPERIMENT EXAMPLE 25 | 60 | 0.6 | 1.5 | 1/40 | 0.5 | 1/125 | 24.4 | 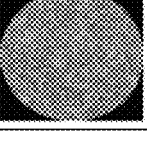 | C |

FIG. 6

| $W_{AVG}/D$ | Ra [nm] | | | | |
|---|---|---|---|---|---|
| | 10 | 20 | 30 | 50 | 100 |
| – | EXPERIMENT EXAMPLE 1: C | | | | |
| 1/20 | EXPERIMENT EXAMPLE 2: C | EXPERIMENT EXAMPLE 5: C | EXPERIMENT EXAMPLE 10: C | EXPERIMENT EXAMPLE 15: C | EXPERIMENT EXAMPLE 20: A |
| 1/50 | | EXPERIMENT EXAMPLE 6: A | EXPERIMENT EXAMPLE 11: A | EXPERIMENT EXAMPLE 16: A | |
| 1/100 | EXPERIMENT EXAMPLE 3: C | EXPERIMENT EXAMPLE 7: A | EXPERIMENT EXAMPLE 12: A | EXPERIMENT EXAMPLE 17: A | EXPERIMENT EXAMPLE 21: A |
| 1/200 | | EXPERIMENT EXAMPLE 8: B | EXPERIMENT EXAMPLE 13: B | EXPERIMENT EXAMPLE 18: A | |
| 1/500 | EXPERIMENT EXAMPLE 4: C | EXPERIMENT EXAMPLE 9: C | EXPERIMENT EXAMPLE 14: C | EXPERIMENT EXAMPLE 19: C | EXPERIMENT EXAMPLE 22: A |

FIG. 7

| | | Ra [nm] | $W_{AVG}/D$ | $W_{SD}/D$ | BLURRED IMAGE EVALUATION RESULT | RESOLUTION EVALUATION RESULT |
|---|---|---|---|---|---|---|
| EXPERIMENT EXAMPLE 26 | ASPHERIC LENS (WITHOUT RANDOM PROCESSING. 2 mm PITCH AND 20 TO 30 nm HEIGHT UNEVENNESS ON LENS SURFACE) | 10 | - | - | C | - |
| EXPERIMENT EXAMPLE 27 | ASPHERIC LENS (WITH RANDOM PROCESSING) | 20 TO 30 mm | 1/100 | 1/150 | A | A |
| EXPERIMENT EXAMPLE 28 | ASPHERIC LENS (WITH RANDOM PROCESSING) | 50 | 1/100 | 1/150 | A | B |
| EXPERIMENT EXAMPLE 29 | ASPHERIC LENS (WITH RANDOM PROCESSING) | 100 | 1/100 | 1/150 | A | C |

LENS, ZOOM LENS, AND IMAGING LENS

CROSS-REFERENCE TO RELATED APPLICATIONS

This application is a Continuation of US application No. U.S. Ser. No. 16/547,608 filed on Aug. 22, 2019, now allowed, which claims priority under 35 U.S.C. § 119(a) to PCT International Application No. PCT/JP2018/005873 filed on Feb. 20, 2018, Japanese Patent Application No. 2017-034074 filed on Feb. 24, 2017 and Japanese Patent Application No. 2018-009060 filed on Jan. 23, 2018. Each of the above application(s) is hereby expressly incorporated by reference, in its entirety, into the present application.

BACKGROUND OF THE INVENTION

1. Field of the Invention

The present invention relates to a lens, a zoom lens comprising the lens, and an imaging lens.

2. Description of the Related Art

For various lenses including television lenses, cine lenses, still lenses, and the like, performances such as reduced size, light weight, high resolution, and high magnification are required, and in addition to those performances, aesthetic quality (smoothness) for blurriness occurred in an image in a defocused state is also required. As blurriness that impairs aesthetic quality of an image, blurriness of a ring zone is present, which appears in a concentric pattern on the image. It is known that the blurriness of the ring zone occurs due to surface unevenness (concentric circle) of a lens used in a lens unit. In the related art, the blurriness of the ring zone is reduced by smoothing a surface of the lens or a surface of a mold used for molding the lens as much as possible (see, for example, Yamagata factory report, "Commitment to manufacturing with high precision lens processing", [online], CAPA camera net, [searched on Feb. 16, 2017], Internet <URL: http://capacamera.net/gmuseum/special/1301_2.html>, Dave Etchells, "The end of onion-ring bokeh? Panasonic beats the curse of aspheric lenses", [online], May 2, 2014, IMAGING RESOURCE, [searched on the Feb. 16, 2017], Internet <URL: http://www.imaging-resource.com/news/2014/05/02/the-end-of-onion-ring-bokeh-panasonic-beats-the-curse-of-aspheric-lenses>, and SEL2470GM Features, "A total of three aspheric lenses including newly developed ultra-high aspheric XA (extreme aspherical) lenses are effectively arranged to realize sharp depiction from aperture opening", [online], Sony Marketing Inc., [searched on Feb. 16, 2017], Internet <URL: http://www.sony.jp/ichigan/products/SEL2470GM/feature_1.html>). Further, each of JP1988-214715A (JP-S63-214715A) and JP1989-147403A (JP-H01-147403A) discloses an optical element for soft focus that has minute unevenness on an optical surface thereof. Although the optical element for soft focus does not have a specific purpose of reduction of the blurriness of the ring zone, the optical element for soft focus is expected to reduce the blurriness of the ring zone.

In a lens disclosed in JP1988-214715A (JP-S63-214715A), a diameter φ of a minute light refraction portion (protrusion portion) provided on the optical surface is 0.05 mm≤φ≤0.5 mm, a height h from the optical surface to an apex of the minute light refraction portion is 0.5 μm≤h≤3 μm, and a ratio S, in the whole surface area, of the minute light refraction portion to the optical surface is 5%≤S≤35%.

In a lens disclosed in JP1989-147403A (JP-H01-147403A), a surface roughness Rmax of the optical surface is 0.05 μm to 1.00 μm.

SUMMARY OF THE INVENTION

As described in Yamagata factory report, "Commitment to manufacturing with high precision lens processing", [online], CAPA camera net, [searched on Feb. 16, 2017], Internet <URL: http://capacamera.net/gmuseum/special/1301_2.html>, Dave Etchells, "The end of onion-ring bokeh? Panasonic beats the curse of aspheric lenses", [online], May 2, 2014, IMAGING RESOURCE, [searched on Feb. 16, 2017], Internet <URL: http://www.imaging-resource.com/news/2014/05/02/the-end-of-onion-ring-bokeh-panasonic-beats-the-curse-of-aspheric-lenses>, and SEL2470GM Features, "A total of three aspheric lenses including the newly developed ultra-high aspheric XA (extreme aspherical) lenses are effectively arranged to realize sharp depiction from aperture opening", [online], Sony Marketing Inc., [searched on Feb. 16, 2017], Internet <URL: http://www.sony.jp/ichigan/products/SEL2470GM/feature_1.html>, in a case of reducing the blurriness of the ring zone by smoothing the surface of the lens or the surface of the mold as much as possible, there is possibility of increasing the number of steps for processing a lens. Meanwhile, in the optical element for soft focus disclosed in each of JP1988-214715A (JP-S63-214715A) and JP1989-147403A (JP-H01-147403A), the blurriness of the ring zone can be inconspicuous by roughening the optical surface to have an uneven shape of the same level as or more than an uneven shape of the optical surface which causes the blurriness of the ring zone. In this way, an effect of reducing the blurriness of the ring zone by roughening the optical surface can be obtained, but the purpose is to obtain a soft focus effect of reducing resolution of the entire image to be captured, and the application is limited to special imaging. Accordingly, effects of maintaining resolution of a screen with high definition and improving a blurred image that occurs before and behind a focal length cannot be obtained.

The present invention has been made in consideration of such circumstances, and an object thereof is to provide a lens, a zoom lens, and an imaging lens capable of eliminating blurriness of a ring zone without reducing resolution and increasing the number of steps for processing.

A lens according to an aspect of the present invention comprises random unevenness within an optical effective diameter of an optical surface, in which an arithmetic mean roughness within the optical effective diameter of the optical surface is 20 nm or more and 50 nm or less, and an average value of widths of protrusion portions of the unevenness on an average line of a roughness curve of the optical surface is 1/200 or more and 1/50 or less of the optical effective diameter of the optical surface.

A zoom lens according to another aspect of the present invention consists of, in order from an object side, a first stationary lens group that has a positive refractive power and is stationary with respect to an image plane during zooming, a plurality of moving lens groups that move independently of each other during zooming, and a second stationary lens group that is positioned closest to an image side, has a positive refractive power, and is stationary with respect to the image plane during zooming, in which the moving lens group includes at least one aspheric lens, and the aspheric lens is the above-described lens.

A zoom lens according to still another aspect of the present invention consists of, in order from an object side, a first stationary lens group that has a positive refractive power and is stationary with respect to an image plane during zooming, a plurality of moving lens groups that move independently of each other during zooming, and a second stationary lens group that is positioned closest to an image side, has a positive refractive power, and is stationary with respect to the image plane during zooming, in which one or both of the first stationary lens group and the second stationary lens group include at least one aspheric lens, and the aspheric lens is the above-described lens.

An imaging lens according to still another aspect of the present invention consists of, in order from an object side, a first lens group, a stop, and a second lens group having a positive refractive power, in which the first lens group is stationary with respect to an image plane during focus adjustment from an object at infinity to a close-range object, and the second lens group includes at least one aspheric lens, and the aspheric lens is the above-described lens.

According to the present invention, a lens, a zoom lens, and an imaging lens can be provided, which are capable of eliminating blurriness of a ring zone without reducing resolution and increasing the number of steps for processing.

BRIEF DESCRIPTION OF THE DRAWINGS

FIG. 3 is a table showing shapes, blurred images, and visual sensory evaluation results of the blurred images of optical surfaces of lenses in Experiment Examples.

FIG. 4 is a table showing shapes, blurred images, and visual sensory evaluation results of the blurred images of optical surfaces of lenses in Experiment Examples.

FIG. 5 is a table showing shapes, blurred images, and visual sensory evaluation results of the blurred images of optical surfaces of lenses in Experiment Examples.

FIG. 6 is a table showing blurred images and visual sensory evaluation results of the blurred images of lenses in Experiment Examples.

FIG. 7 is a table showing shapes, visual sensory evaluation results of blurred images, and resolution evaluation results of optical surfaces of lenses in Experiment Examples.

DESCRIPTION OF THE PREFERRED EMBODIMENTS

Figure 1:
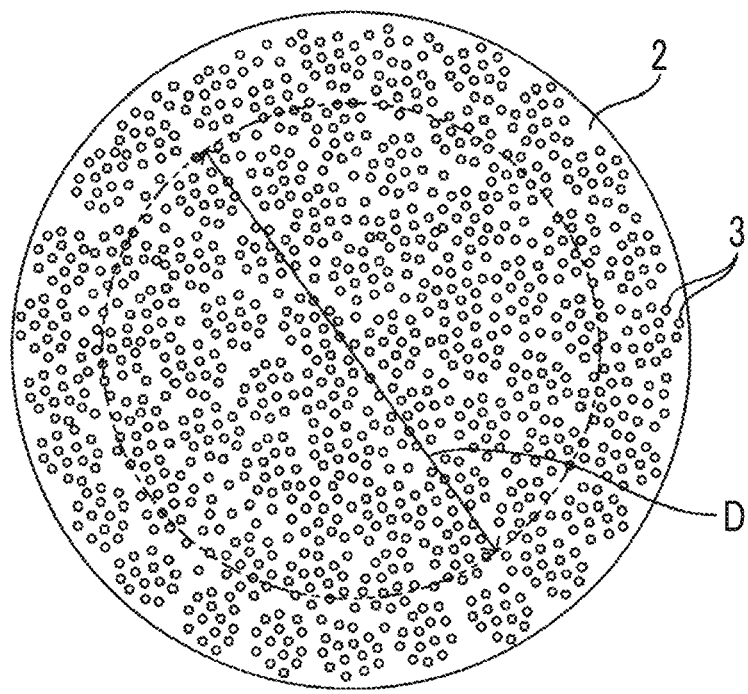
FIG. 1 is a front view of an example of a lens for describing an embodiment of the present invention.
Figure 2:
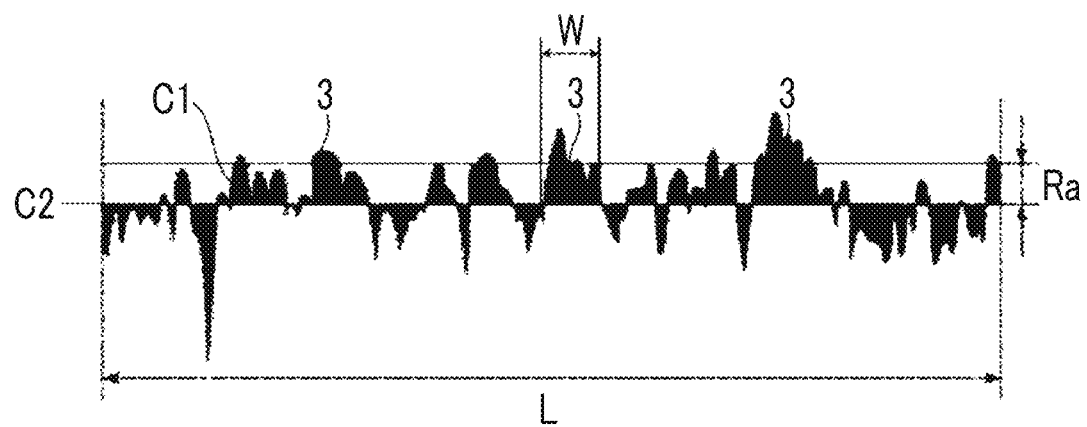
FIG. 2 is a schematic view of a roughness curve of an optical surface of the lens shown in FIG. 1.

FIG. 1 shows one example of a lens for describing an embodiment of the present invention, and FIG. 2 shows one example of a roughness curve of an optical surface of the lens of FIG. 1.

A lens 1 shown in FIGS. 1 and 2 is made of a resin material or a glass material. Examples of the resin material include cycloolefin polymers (COP), polymethyl methacrylate (PMMA), or the like. Examples of the glass material include quartz glass or the like.

The lens 1 has an optical surface 2. The optical surface 2 may be a convex curved surface, a concave curved surface, or a flat surface. The curved surface is not limited to a spherical surface, and may be an aspheric surface.

The lens 1 has random unevenness within the optical effective diameter D of the optical surface 2. Here, the optical effective diameter means the diameter of parallel rays that originates from an object point at infinity on the optical axis of the lens and passes through the lens. For example, the optical effective diameter can be set to be a value measured by a method based on a pinhole on a focal plane, which is defined in JIS B 7095. Moreover, random unevenness means that the unevenness arrangement has no regularity such as concentric or radial and the unevenness arrangement is irregular.

The arithmetic mean roughness Ra in the optical effective diameter D of the optical surface 2 which has random unevenness is set to be 20 nm or more and 50 nm or less. The arithmetic mean roughness Ra is determined by the method defined in JIS B 0601. That is, by measuring the cross-sectional curve of the optical surface 2 with a three-dimensional measurement machine (for example, UA3P manufactured by Panasonic Production Engineering Co., Ltd.), and applying a high pass filter (cutoff value $\lambda c$) to the measured cross-sectional curve, a roughness curve in which the long wavelength component (undulating curve) is removed from the cross-sectional curve is obtained. The cutoff value $\lambda c$ is not particularly limited, but can be, for example, 8 mm at an effective diameter of 32 mm. Then, only the reference length L is extracted from the obtained roughness curve C1, and, as shown in the following expression, the absolute values of the deviation f(x) between the roughness curve C1 and the average line C2 (undulating curve representing the long wavelength component to be removed by the high pass filter) are summed up in the range of the extracted reference length L, and the value obtained by averaging the sums is taken as the arithmetic mean roughness Ra. The reference length L can be, for example, 8 mm.

$$Ra = 1/L \cdot \int |f(x)| dx$$

Furthermore, the average value of the widths W of the protrusion portions 3 of the unevenness on the average line C2 of the optical surface 2 is 1/200 or more and 1/50 or less of the optical effective diameter D of the optical surface 2. The protrusion portions 3 to provide the average value of the widths W are the protrusion portions 3 included in the reference length L extracted in a case of obtaining the arithmetic mean roughness Ra in the optical effective diameter D of the optical surface 2.

The unevenness of the optical surface 2 can be formed, for example, by etching the mold surface used for molding of the lens 1 to form unevenness, and transferring the unevenness of the mold surface to the lens material by molding. The unevenness of the optical surface 2 can also be formed by etching the optical surface 2.

With the lens 1 configured as described above, it is possible to reduce the blurriness of a ring zone appearing in a blurred image that occurs before and behind the focusing distance while maintaining the resolution of the screen with high definition. From the viewpoint of reducing the blurriness of the ring zone, it is preferable that the standard deviation of the widths W of the protrusion portion 3 is less than 1/125 of the optical effective diameter D of the optical surface 2. The protrusion portions 3 to provide the standard deviation of the widths W are the protrusion portions 3 included in the reference length L extracted in a case of obtaining the arithmetic mean roughness Ra in the optical effective diameter D of the optical surface 2. Furthermore, it is preferable that the arithmetic mean roughness Ra in the optical effective diameter D of the optical surface 2 is 20 nm or more and 30 nm or less, and the average value of the widths W of the protrusion portions 3 is 1/100 or more and 1/50 or less of optical effective diameter D of the optical surface 2.

The contrast of the ring zone that appears in the unevenness of the processing residual shape of the lens surface and the blurred image is theoretically considered in a document "Theory of bokeh image structure in camera lenses with an aspheric surface", Optical Engineering, Vol. 53 (6), 2014. The document discloses that even the unevenness of the processing residual which does not affect the resolution of the lens has a great influence on the contrast of the ring zone of the blurred image. Yamagata factory report, "Commitment to manufacturing with high precision lens processing", [online], CAPA camera net, [searched on Feb. 16, 2017], Internet <URL: http://capacamera.net/gmuseum/special/1301_2.html>, Dave Etchells, "The end of onion-ring bokeh? Panasonic beats the curse of aspheric lenses", [online], May 2, 2014, IMAGING RESOURCE, [searched on Feb. 16, 2017], Internet <URL: http://www.imaging-resource.com/news/2014/05/02/the-end-of-onion-ring-bokeh-panasonic-beats-the-curse-of-aspheric-lenses>, and SEL2470GM Features "A total of three aspheric lenses including the newly developed ultra-high aspheric XA (extreme aspherical) lenses are effectively arranged to realize sharp depiction from aperture opening", [online], Sony Marketing Inc., [searched on Feb. 16, 2017], Internet <URL: http://www.sony.jp/ichigan/products/SEL2470GM/feature_1.html> disclose that the contrast of the ring zone is reduced by suppressing the unevenness of the processing residual as much as possible. However, in the present invention, a method of reducing the contrast of the ring zone is implemented by providing the random unevenness that does not affect the resolution, even in a state where the processing residual is relatively large. Various studies have been conducted to examine the favorable condition. Specifically, in a case of giving an optional shape to the optical surface of the lens by applying the method described in the document "Theory of bokeh image structure in camera lenses with an aspheric surface", Optical Engineering, Vol. 53 (6), 2014, a blurred image was generated by simulation, and the generated blurred image was visually sensory-evaluated. Hereinafter, an experiment example of the lens 1 will be described.

In the lens model used for simulation (hereinafter, simply referred to as a lens), the optical effective diameter D of the optical surface was set to be 58 mm, and a concentric protrusion shape having a height of 30 nm and a pitch of 2 mm was given to the optical surface in order to reproduce the optical surface on which blurriness of a ring zone occurs. This optical surface was subjected to random processing that gives random unevenness, and lenses were produced in which the arithmetic mean roughness Ra within the optical effective diameter of the optical surface, and the average value $W_{AVG}$ and the standard deviation $W_{SD}$ of the widths W of the protrusion portions were variously different. In the random processing, two parameters of the processing depth and the area ratio between a processed portion and an unprocessed portion (area of processed portion/area of unprocessed portion) were variously changed. In the simulation, in a state where the lens exit pupil position was 101 mm apart from the image focal plane to the object side, the exit pupil diameter was 53 mm, and the diameter of the ray incident on the lens was 58 mm, a blurred image was generated on the evaluation surface defocused by 11 mm from the image focal plane of the lens to the camera side.

In the visual sensory evaluation of the blurred image, based on the blurred image of the lens (processing depth=0, area ratio=0) of Experiment Example 1 in which the random processing was not performed, in a case where blurriness of a ring zone disappeared, the evaluation was regarded as "A", in a case where the blurriness of the ring zone is locally remaining but the contrast of the blurriness of the ring zone is recognized to be reduced with respect to the reference blurred image, the evaluation was regarded as "B", and in a case where the blurriness of the ring zone remains as a whole and the contrast of the blurriness of the ring zone is not recognized to be reduced with respect to the reference blurred image, the evaluation was regarded as "C".

FIGS. 3 to 6 show shapes of the optical surfaces of the lenses of the experiment examples, blurred images generated by simulation, and the results of visual sensory evaluation of the blurred images.

In the lenses of Experiment Examples 1 to 4, the arithmetic mean roughness Ra in the optical effective diameter was less than 20 nm, the visual sensory evaluation results thereof were all "C", and regardless of how the ratio ($W_{AVG}/D$) of the average value $W_{AVG}$ of the widths W of the protrusion portions with respect to the optical effective diameter D was set, the blurriness of the ring zone remained. In addition, in the lenses of Experiment Examples 20 and 21, the arithmetic mean roughness Ra exceeded 50 nm, the visual sensory evaluation results thereof were all "A", and regardless of the $W_{AVG}/D$, the blurriness of the ring zone disappeared. On the other hand, in the lenses of Experiment Examples 5 to 19, the arithmetic mean roughness Ra was 20 nm or more and 50 nm or less, and in these cases, the reduction effect of the blurriness of the ring zone was changed in accordance with the $W_{AVG}/D$. For example, the visual sensory evaluation results of the lenses of Experiment Examples 9, 14, and 19 having the $W_{AVG}/D$ of 1/500 were "C", and the visual sensory evaluation results of the lenses of Experiment Examples 5, 10, and 15 having the $W_{AVG}/D$ of 1/20 were also "C". On the other hand, the visual sensory evaluation results of Experiment Examples 6 to 8, 11 to 13, and 16 to 18 having the $W_{AVG}/D$ of 1/200 or more and 1/50 or less were "A" or "B". From the above, it can be understood that, in a case where the arithmetic mean roughness Ra is 20 nm or more and 50 nm or less, by setting the $W_{AVG}/D$ to 1/200 or more and 1/50 or less, the blurriness of the ring zone can be eliminated or reduced, and it is preferable that the $W_{AVG}/D$ is 1/100 or more and 1/50 or less. Further, in the lenses of Experiment Examples 23 to 25, the ratio ($W_{SD}/D$) of the standard deviation $W_{SD}$ of the widths W of the protrusion portions to the optical effective diameter D was made to be different by setting the arithmetic mean roughness Ra to 20 nm or more and 50 nm or less. As the $W_{SD}/D$ increases, the $W_{AVG}/D$ increases, and thus in the lens of Experiment Example 25 in which the $W_{SD}/D$ is 1/125, the $W_{AVG}/D$ exceeded 1/50. Therefore, it is preferable that the $W_{SD}/D$ is 0 or more and less than 1/125.

Next, in a single-focus lens unit with a focal length of 100 mm and a T value of 2.0 (composition of 11 lenses), a lens (in which the outer diameter is 60.5 mm, the curvature radius of the surface on the object side is 148.68 mm, and the surface on the image side is flat) which is disposed closest to the image side was replaced with an aspheric lens on which the above-mentioned random processing was performed, or an aspheric lens on which the above-mentioned random processing was not performed, and visual sensory evaluation and resolution evaluation of a blurred image were performed. For visual sensory evaluation of the blurred image, a point light source was placed at a distance of 3 m from the object side of the lens, the focus of the lens was adjusted to infinity to image the point light source, and the captured blurred image was visually sensory-evaluated. In visual sensory evaluation of the captured blurred image, the evaluation standards of "A" evaluation, "B" evaluation, and "C" evaluation were the same as the evaluation standard of visual sensory evaluation of the blurred image in the simulation described above. In addition, resolution evaluation was performed using a modulation transfer function (MTF) measurement machine (manufactured by FK Optical Co., Ltd.: matrix MTF measurement device), and an MTF value measured at a spatial frequency of 40 lp/mm at the central angle of view of the lens unit was regarded as an evaluation value of the resolution. Then, based on the MTF value of the aspheric lens that was not subjected to random processing, in a case where the resolution deterioration rate is 0% or more and less than 3%, the evaluation was regarded as "A", in a case where the resolution deterioration rate is 3% or more and less than 6%, the evaluation was regarded as "B", and in a case where the resolution deterioration rate was 6% or more, the evaluation was regarded as "C".

FIG. 7 shows the shapes of the optical surfaces of the lenses of the experiment examples, and the results of visual sensory evaluation and resolution evaluation of the captured blurred images.

The resolution evaluation of the lens of Experiment Example 29 in which the arithmetic mean roughness Ra was 100 nm was "C" evaluation. As described above, in a case where the arithmetic mean roughness Ra exceeds 50 nm, the blurriness of the ring zone disappeared regardless of the ratio ($W_{AVG}/D$) of the average value $W_{AVG}$ of the widths W of the protrusion portions to the optical effective diameter D, but resolution also deteriorated. On the other hand, the resolution evaluation of the lens of Experiment Example 28 in which the arithmetic mean roughness Ra was 50 nm was "B" evaluation, and the resolution evaluation of the lens of Experiment Example 27 in which the arithmetic mean roughness Ra was 20 nm to 30 nm was "A" evaluation. The visual sensory evaluations of the lenses of Experiment Examples 27 and 28 were all "A" evaluation. From the above, it can be found that, by setting the arithmetic mean roughness Ra to 20 nm or more and 50 nm or less, reduction of the blurriness of the ring zone and maintenance of screen resolution can be both achieved. Preferably the arithmetic mean roughness Ra is 20 nm or more and 30 nm or less.

Next, a zoom lens and an imaging lens comprising the lens 1 shown in FIGS. 1 and 2 will be described.

Figure 8:
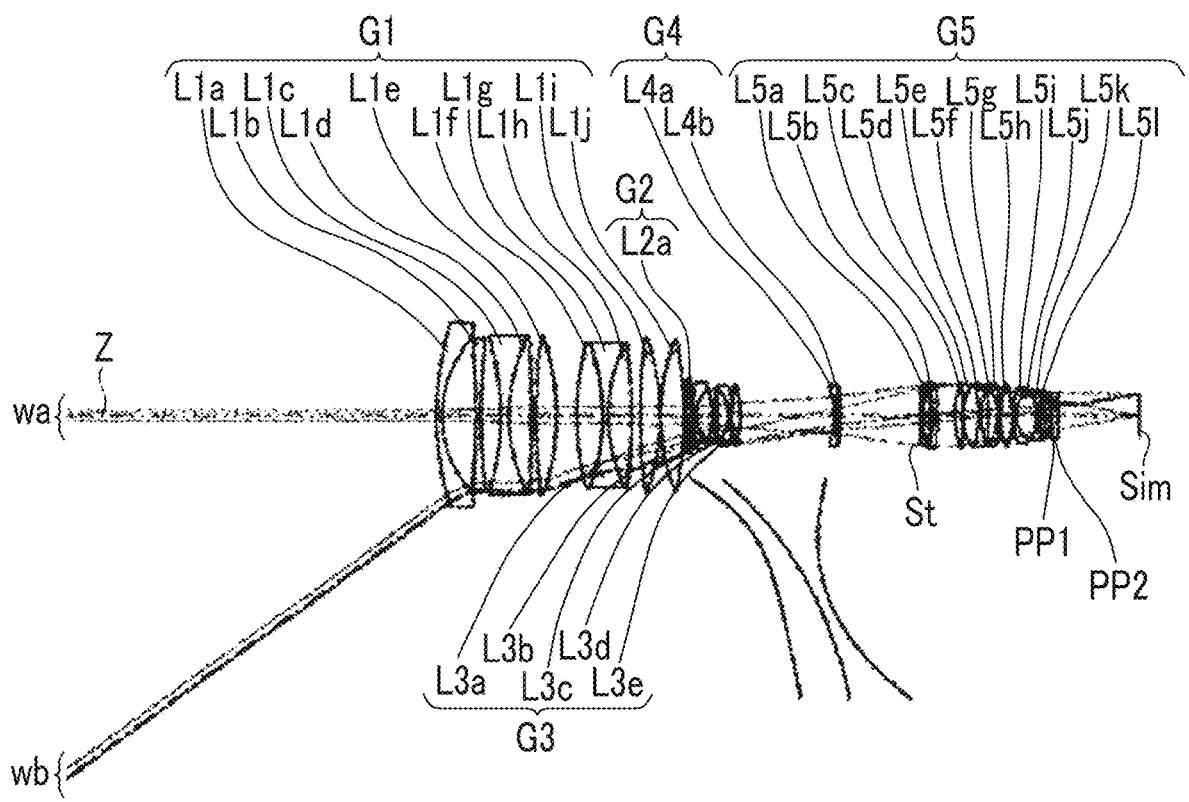
FIG. 8 is a schematic view of a zoom lens comprising the lens of FIG. 1 in a state in which a focal length is at a wide angle end.
Figure 9:
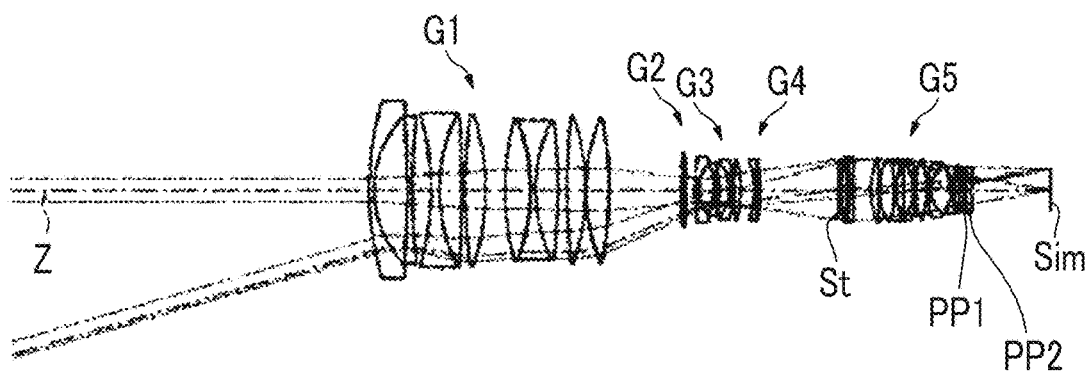
FIG. 9 is a schematic view of the zoom lens of FIG. 8 in a state in which the focal length is at an intermediate position between the wide angle end and a telephoto end.
Figure 10:
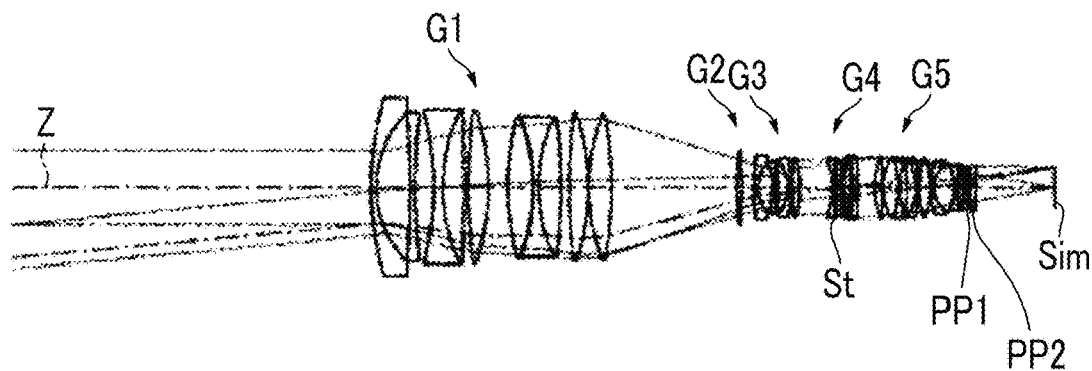
FIG. 10 is a schematic view of the zoom lens of FIG. 8 in a state in which the focal length is at the telephoto end.

FIGS. 8 to 10 show an example of the zoom lens comprising the lens 1.

FIG. 8 shows a state in which a focal length is at a wide angle end, FIG. 9 shows a state in which the focal length is at an intermediate position between the wide angle end and a telephoto end, and FIG. 10 shows a state in which the focal length is at the telephoto end. In FIGS. 8 to 10, it should be noted that the left side is the object side and the right side is the image plane side, and the illustrated aperture stop St does not necessarily represent the size or the shape thereof, and just indicates a position of the aperture stop on the optical axis Z. Further, in the light path diagram of FIG. 8, the movement locus of each lens group during zooming, the on-axis rays wa and the ray wb of the maximum angle of view are shown together.

The zoom lens 10 shown in FIGS. 8 to 10 is substantially composed of, in order from the object side, a first lens group G1 that remains stationary during zooming and has a positive refractive power, a plurality of moving lens groups that move independently of each other by changing distances between groups adjacent to each other in a direction of an optical axis during zooming, and a final lens group that has a positive refractive power, is disposed closest to the image side, and remains stationary during zooming. In the examples shown in FIGS. 8 to 10, the zoom lens 10 is composed of the first lens group G1 that has a positive refractive power and remains stationary during zooming, second to fourth lens groups G2 to G4 (moving lens groups) that move independently of each other by changing distances between groups adjacent to each other in a direction of an optical axis during zooming, and a fifth lens group G5 (final lens group) that has a positive refractive power, is disposed closest to the image side, and remains stationary during zooming. The first lens group G1 is composed of ten lenses L1a to L1j, the second lens group G2 is composed of one lens L2a, the third lens group G3 is composed of five lenses L3a to L3e, the fourth lens group G4 is composed of two lenses L4a and L4b, and the fifth lens group G5 is composed of 12 lenses L5a to L5l.

In a case of applying the zoom lens 10 to an imaging apparatus, it is preferable to dispose a cover glass, a prism, and various filters such as an infrared cut filter and a low pass filter between the optical system and the image plane Sim according to the configuration of the camera on which the lens is mounted. Therefore, FIGS. 8 to 10 show an example in which parallel flat plate-like optical members PP1 and PP2 assumed as the above members are disposed between the lens system and the image plane Sim.

As described above, by setting the first lens group G1 closest to the object side to have a positive refractive power, it is possible to shorten the total length of the lens system, and thus it is advantageous in reducing the size. In addition, by setting the first lens group G1 closest to the image side to have a positive refractive power, it is possible to suppress an increase in incident angle of the principal ray of the off-axis rays incident onto the image plane Sim, which makes it possible to suppress shading. Furthermore, since the lens group closest to the object side and the lens group closest to the image side remain stationary during zooming and the total length of the lens system does not change, it is possible to obtain the zoom lens having a small change in the center of gravity during zooming and good operability.

The plurality of moving lens groups are composed of, in order from the object side, a lens group having a positive refractive power, a lens group having a negative refractive power, and a lens group having a negative refractive power. In general, the moving amount of the moving lens group having a negative refractive power can be smaller in a case where the number of the moving lens groups is two than in a case where the number is one. Therefore, the above-mentioned composition can result in reduction in the total length of the lens system. Since the image height can be lowered by including the moving lens group having a positive refractive power, the effective diameter of the first lens group G1 on the telephoto side can be suppressed. From the above, the size and weight of the whole zoom lens can be reduced.

The first lens group G1 has at least two negative lenses, and the negative lens closest to the object side has a meniscus shape convex toward the object side, and the first n lens, which is at least one negative lens of the second and subsequent negative lenses, is composed to satisfy following Conditional Expressions (1) and (2). In FIGS. 8 to 10, the lens L1c corresponds to the first n lens.

As described above, by arranging at least two negative lenses in the first lens group G1, it is possible to obtain a negative refractive power necessary for achieving the wide angle. The negative lens of the first lens group G1, which is closest to the object side, has a meniscus shape convex toward the object side, which makes it possible to suppress the occurrence of astigmatism and distortion. Further, the arrangement of the first n lens satisfying the following Conditional Expressions (1) and (2) in the first lens group G1 makes it possible to make good correction of chromatic aberration of the first lens group G1, and in particular, to make good correction of lateral chromatic aberration on the wide angle side and make correction of longitudinal chromatic aberration on the telephoto side.

By satisfying Conditional Expression (1), lateral chromatic aberration on the wide angle side and longitudinal chromatic aberration on the telephoto side during focusing can be favorably corrected. Further, by satisfying Conditional Expression (2) together with Conditional Expression (1), the secondary spectrum can be favorably corrected.

$$62 < vdn \ldots \quad (1)$$

$$0.64 < \theta gFn + 0.001625 \times vdn < 0.7 \ldots \quad (2)$$

here,
vdn: Abbe number of the first n lens at a d line
θgFn: Partial dispersion ratio of the first n lens Next, numerical examples of the zoom lens 10 will be described. Table 1 shows basic lens data of the zoom lens 10, Table 2 shows data on specification, Table 3 shows data on changing surface distance, and Table 4 shows data on aspheric surface coefficients.

In the lens data of Table 1, the column of the surface number shows surface numbers that increase sequentially toward the image plane side, with the surface of an element closest to the object side being regarded as the first surface. The column of the curvature radius shows curvature radii of the respective surfaces. The column of the surface distance shows surface distances on the optical axis Z between the respective surfaces and the next surfaces. The column of nd shows the refractive indexes of respective optical elements at a d line (a wavelength of 587.6 nm), the column of vd shows Abbe numbers of respective optical elements at the d line (a wavelength of 587.6 nm), and the column of θgF shows the partial dispersion ratios of respective optical elements.

The partial dispersion ratio θgF is expressed by the following expression.

$$\theta gF = (Ng - NF)/(NF - NC)$$

here,
Ng: refractive index at a g line
NF: refractive index at an F line
NC: refractive index at a C line Here, reference signs of curvature radii are set to be positive in a case where the surface shapes are convex toward the object side, and reference signs of curvature radii are set to be negative in a case where of the surface shapes are convex toward the image plane side. The basic lens data includes an aperture stop St and optical members PP1 and PP2. In the column of a surface number of a surface corresponding to the stop St, the surface number and a term of (stop) are noted. Further, in the lens data of Table 1, DD [surface number] is described in the place of the surface distance in which the distance changes during zooming. The numerical values corresponding to DD [surface number] are shown in Table 3.

Values of a zoom magnification, a focal length f', an F value FNo., a total angle of view 2ω are shown in data on the specification in Table 2.

In the lens data of Table 1, the reference sign * is attached to surface numbers of aspheric surfaces, and numerical values of the paraxial curvature radii are shown as the curvature radius of the aspheric surface. The data on the aspheric surface coefficients in Table 4 show surface numbers for the aspheric surfaces and the aspheric surface coefficients for the aspheric surfaces. The aspheric surface coefficients are values of the coefficients KA and Am (m=3 . . . 20) in aspheric surface expression represented as the following expression.

$$Zd = C \cdot h^2 / \{1 + (1 - KA \cdot C^2 \cdot h^2)^{1/2}\} + \Sigma Am \cdot h^m$$

here,
Zd: aspheric surface depth (a length of a perpendicular drawn from a point on an aspheric surface at height h to a plane that is perpendicular to the optical axis that contacts the vertex of the aspheric surface)
h: height (a distance from the optical axis)
C: reciprocal of paraxial curvature radius
KA, Am: aspheric surface coefficient (m=3 . . . 20)

In the basic lens data, the data on specification, and the data on changing surface distance, a degree is used as a unit of an angle, and mm is used as a unit of a length, but since the optical system can be used with magnification and reduction in proportion, appropriate different units may be used.

TABLE 1

| Surface Number | Curvature Radius | Surface Distance | nd | vd | θgF |
| --- | --- | --- | --- | --- | --- |
| 1 | 214.0485 | 3.6001 | 1.88300 | 40.76 | 0.56679 |
| 2 | 75.1630 | 22.9827 | | | |
| 3 | −597.4831 | 3.3000 | 1.73400 | 51.47 | 0.54874 |
| 4 | 443.5473 | 12.9081 | | | |
| 5 | −187.4186 | 5.8583 | 1.53775 | 74.70 | 0.53936 |

TABLE 1-continued

| Surface Number | Curvature Radius | Surface Distance | nd | vd | θgF |
|---|---|---|---|---|---|
| 6 | 122.1466 | 14.7216 | 1.91650 | 31.60 | 0.59117 |
| 7 | −1192.6629 | 2.6958 | | | |
| *8 | 337.3004 | 13.7943 | 1.43875 | 94.94 | 0.53433 |
| 9 | −172.5134 | 13.4076 | | | |
| 10 | 192.0693 | 17.0129 | 1.49700 | 81.54 | 0.53748 |
| 11 | −139.9406 | 0.6538 | | | |
| 12 | −133.1303 | 3.3500 | 1.85150 | 40.78 | 0.56958 |
| 13 | 115.2733 | 15.2541 | 1.49700 | 81.54 | 0.53748 |
| 14 | −398.0807 | 6.0395 | | | |
| 15 | 459.0857 | 12.9020 | 1.53775 | 74.70 | 0.53936 |
| 16 | −156.6756 | 0.2000 | | | |
| 17 | 137.1994 | 15.6658 | 1.49700 | 81.54 | 0.53748 |
| 18 | −276.3776 | DD [18] | | | |
| 19 | 362.4361 | 2.9957 | 1.49700 | 81.54 | 0.53748 |
| 20 | −555.5230 | DD [20] | | | |
| *21 | 212.6957 | 2.4011 | 1.53775 | 74.70 | 0.53936 |
| 22 | 27.2627 | 10.4426 | | | |
| 23 | −42.9639 | 1.2004 | 2.00100 | 29.13 | 0.59952 |
| 24 | 191.3068 | 2.4309 | | | |
| 25 | −105.3359 | 6.7325 | 1.69895 | 30.13 | 0.60298 |
| 26 | −28.8119 | 2.4783 | 1.69560 | 59.05 | 0.54348 |
| 27 | −82.6623 | 0.3007 | | | |
| 28 | 161.3383 | 5.2491 | 1.83481 | 42.72 | 0.56486 |
| 29 | −80.5118 | DD [29] | | | |
| 30 | −52.0619 | 1.3100 | 1.49700 | 81.54 | 0.53748 |
| 31 | 1116.7924 | 1.9941 | 1.84666 | 23.83 | 0.61603 |
| 32 | −307.6714 | DD [32] | | | |
| 33 (stop) | ∞ | 1.8275 | | | |
| 34 | 118.3571 | 3.8140 | 1.91082 | 35.25 | 0.58224 |
| 35 | −350.3523 | 2.5727 | | | |
| 36 | −105.5123 | 3.0000 | 1.76182 | 26.52 | 0.61361 |
| 37 | −208.3315 | 11.3437 | | | |
| 38 | 59.9113 | 5.2848 | 1.65844 | 50.88 | 0.55612 |
| 39 | ∞ | 0.3009 | | | |
| 40 | 42.0799 | 10.3271 | 1.43875 | 94.94 | 0.53433 |
| 41 | −78.3277 | 1.5500 | 1.95375 | 32.32 | 0.59015 |
| 42 | 56.6019 | 4.9263 | | | |
| 43 | −226.8790 | 6.1786 | 1.80518 | 25.43 | 0.61027 |
| 44 | −36.3203 | 1.4100 | 1.80400 | 46.58 | 0.55730 |
| 45 | −106.9554 | 0.4084 | | | |
| 46 | 64.4975 | 7.8638 | 1.48749 | 70.24 | 0.53007 |
| 47 | −64.4975 | 0.2001 | | | |
| 48 | 54.5207 | 2.0998 | 1.91082 | 35.25 | 0.58224 |
| 49 | 20.5114 | 13.6195 | 1.49700 | 81.54 | 0.53748 |
| 50 | −42.0493 | 1.6000 | 1.90043 | 37.37 | 0.57720 |
| 51 | 57.4339 | 0.6085 | | | |
| 52 | 48.2644 | 3.3704 | 1.84666 | 23.83 | 0.61603 |
| 53 | 240.7851 | 3.0000 | | | |
| 54 | ∞ | 1.4000 | 1.51633 | 64.14 | 0.53531 |
| 55 | ∞ | 1.0000 | | | |
| 56 | ∞ | 3.6900 | 1.51633 | 64.14 | 0.53531 |
| 57 | ∞ | 54.0311 | | | |

TABLE 2

| | Wide Angle End | Intermediate | Telephoto End |
|---|---|---|---|
| Zoom Magnification | 1.0 | 2.4 | 7.4 |
| F' | 19.91 | 46.80 | 146.33 |
| FNo. | 2.86 | 2.86 | 2.86 |
| 2ω [°] | 73.6 | 33.2 | 11.0 |

TABLE 3

| | Wide Angle End | Intermediate | Telephoto End |
|---|---|---|---|
| DD [18] | 1.4993 | 49.5135 | 85.3829 |
| DD [20] | 1.4865 | 6.8361 | 8.7457 |
| DD [29] | 62.9756 | 9.2695 | 21.2659 |
| DD [32] | 52.4033 | 52.7456 | 2.9702 |

TABLE 4

| Surface Number | 8 |
|---|---|
| KA | 1.0000000E+00 |
| A3 | 1.5064530E−07 |
| A4 | −1.5641141E−07 |
| A5 | 1.6501598E−09 |
| A6 | −3.9701428E−11 |
| A7 | 6.9263338E−13 |

TABLE 4-continued

| | |
|---|---|
| A8 | 1.0556630E−17 |
| A9 | −7.0509369E−17 |
| A10 | 5.3287613E−19 |

| Surface Number | 21 |
|---|---|
| KA | 1.0000000E+00 |
| A4 | 1.5045420E−06 |
| A6 | −4.1679388E−10 |
| A8 | −8.9800509E−12 |
| A10 | 7.0993908E−14 |
| A12 | −3.2299521E−16 |
| A14 | 8.7823289E−19 |
| A16 | −1.4036759E−21 |
| A18 | 1.2097861E−24 |
| A20 | −4.3023907E−28 |

Here, it is preferable that the first lens group G1 and the fifth lens group G5, which are stationary lens groups, includes at least one aspheric lens, and the aspheric lens is the lens 1 shown in FIGS. 1 and 2. At the telephoto end, the on-axis rays wa is relatively thick in the first lens group G1 and the fifth lens group G5 and the aspheric lens composed of the lens 1 is included in the first lens group G1 and/or the fifth lens group G5, which makes it possible to effectively reduce the blurriness of the ring zone at telephoto end. In the lens data of Table 1, the lens L1e of the first lens group G1 having an aspheric optical surface indicated by surface number 8 and the lens L3a of the third lens group G3 having an aspheric optical surface indicated by surface number 21 are composed of the lens 1.

Figure 11:
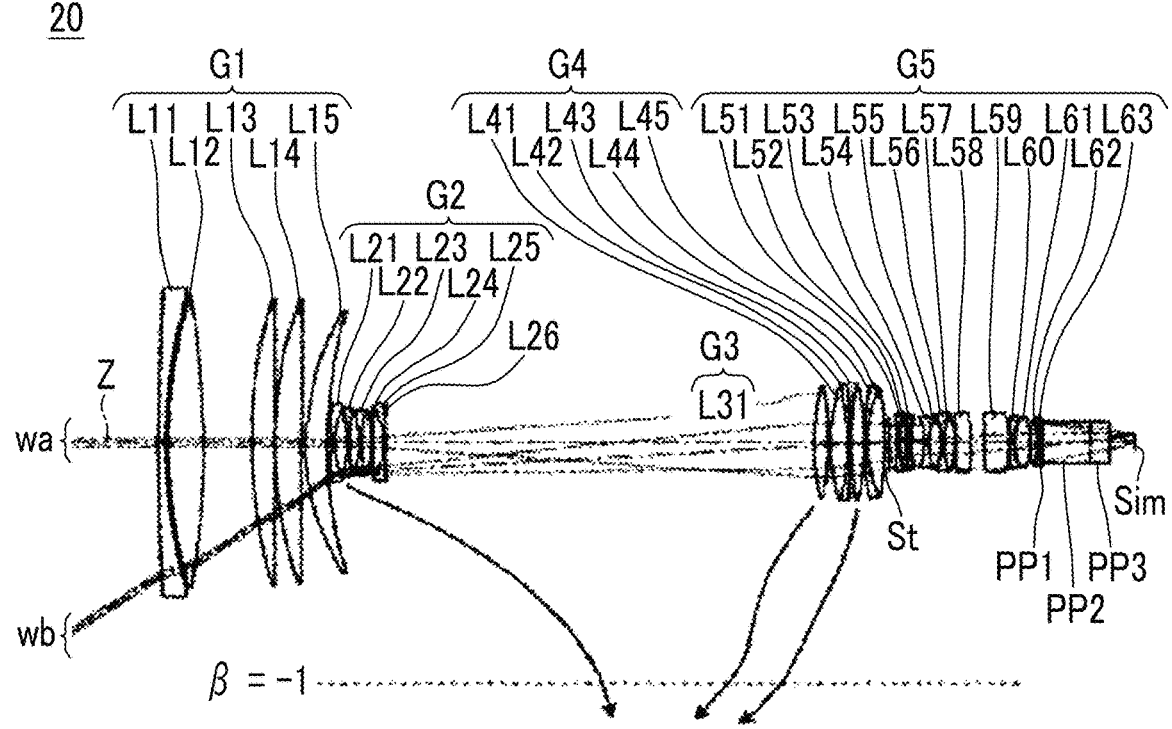
FIG. 11 is a schematic view of another zoom lens comprising the lens of FIG. 1 in a state in which a focal length is at a wide angle end.
Figure 12:
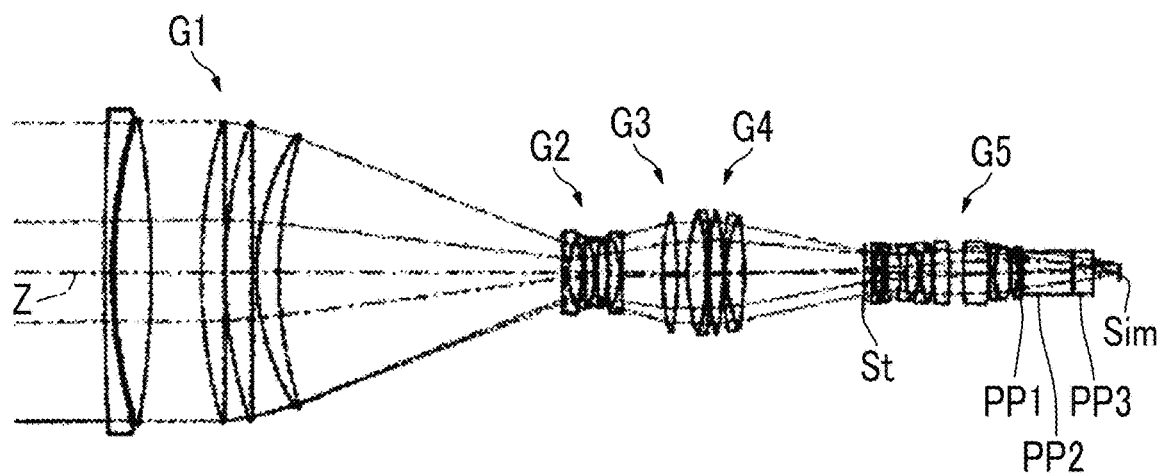
FIG. 12 is a schematic view of the zoom lens of FIG. 11 in a state in which the focal length is at an intermediate position between the wide angle end and a telephoto end.
Figure 13:
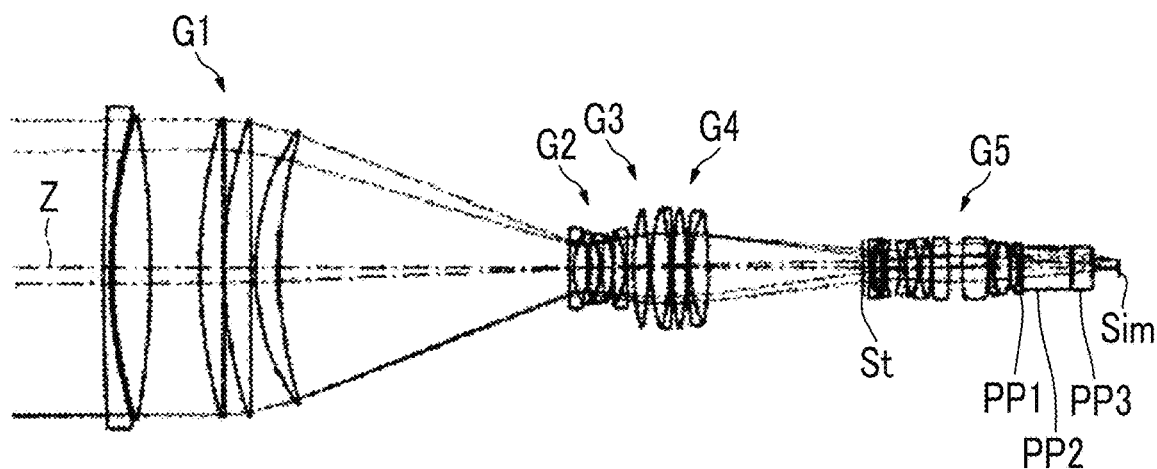
FIG. 13 is a schematic view of the zoom lens of FIG. 11 in a state in which the focal length is at the telephoto end.

FIGS. 11 to 13 show another example of the zoom lens comprising the lens 1.

FIG. 11 shows a state in which a focal length is at a wide angle end, FIG. 12 shows a state in which the focal length is at an intermediate position between the wide angle end and a telephoto end, and FIG. 13 shows a state in which the focal length is at the telephoto end. In FIGS. 11 to 13, it should be noted that the left side is the object side and the right side is the image plane side, and the illustrated aperture stop St does not necessarily represent the size or the shape thereof, and just indicates a position of the aperture stop on the optical axis Z. Further, in the light path diagram of FIG. 11, the on-axis rays wa and the rays wb at the maximum angle of view, the movement locus of each lens group during zooming (arrows in the figure), and the point at which the imaging magnification is −1 (a horizontal dotted line in the figure) are shown together.

As shown in FIGS. 11 to 13, the zoom lens 20 consists of, in order from the object side along the optical axis Z, a first lens group G1 having a positive refractive power, a second lens group G2 having a negative refractive power, a third lens group G3 having a positive refractive power, a fourth lens group G4 having a positive refractive power, an aperture stop St, and a fifth lens group G5 having a positive refractive power.

In a case of applying the zoom lens 20 to an imaging apparatus, it is preferable to dispose a cover glass, a prism, and various filters such as an infrared cut filter and a low pass filter, between the optical system and the image plane Sim according to the configuration of the camera on which the lens is mounted. Therefore, FIGS. 11 to 13 show an example in which parallel flat plate-like optical members PP1 to PP3 assumed as the above members are disposed between the lens system and the image plane Sim.

Further, during zooming, the first lens group G1 and the fifth lens group G5 are configured to remain stationary with respect to the image plane Sim, and the second lens group G2, the third lens group G3, and the fourth lens group G4 are configured to move independently of each other so as to change the distance therebetween, and during zooming from the wide angle end to the telephoto end, the second lens group G2 is configured to move from the object side to the image plane side.

The second lens group G2 is configured to comprise at least four negative lenses including three negative lenses arranged successively from the object side and at least one positive lens. As described above, by assigning the negative refractive power of the second lens group G2 to four or more negative lenses, it is possible to suppress fluctuations in spherical aberration and distortion during zooming, which is advantageous for increasing the magnification. In addition, since the refractive powers of the negative lens and the positive lens can be increased while maintaining the refractive power of the second lens group G2, even in a case where the Abbe number difference between the positive lens and the negative lens is not set to be large in consideration of 2nd chromatic aberration correction, fluctuations of longitudinal chromatic aberration and lateral chromatic aberration during zooming can be suppressed. Furthermore, by making three negative lenses be arranged successively in order from the object side of the second lens group G2 and concentrating the negative refractive power on the object side of the second lens group G2, the angle formed by the principal ray of the periphery angle of view, which is incident on subsequent lenses, and the optical axis at the wide angle end can be reduced, which is advantageous for achieving the wide angle. Also, deteriorations of distortion and astigmatism at the time of increasing magnification can be prevented, and astigmatism likely to be generated by the first lens group G1 can be corrected at the wide angle end.

Assuming that the lens closest to the object side among these negative lenses is the L21 negative lens, a configuration for satisfying following Conditional Expressions (3) and (4) is established. By not allowing the value of Conditional Expression (3) to be equal to or less than the lower limit, it is possible to suppress fluctuations in 1st-order lateral chromatic aberration and 1st-order longitudinal chromatic aberration during zooming. By not allowing the value of Conditional Expression (3) to be equal or larger than the upper limit, it is possible to correct 2nd lateral chromatic aberration at the wide angle end which occurs in the first lens group G1 at the time of correcting 2nd longitudinal chromatic aberration at the telephoto end, and it is possible to well-balancedly correct 2nd longitudinal chromatic aberration at the telephoto end, lateral chromatic aberration at the telephoto end, and 2nd lateral chromatic aberration at the wide angle end.

The effect of the lower limit of Conditional Expression (3) can be made more remarkable by not allowing the value of Conditional Expression (3) to be equal to or less than the lower limit and not allowing the value of Conditional Expression (4) to be equal to or less than the lower limit. By not allowing the value of Conditional Expression (4) to be equal to or greater than the upper limit, it is possible to prevent distortion at the wide angle end from deteriorating.

$$25 < vd21 < 45 \ldots \quad (3)$$

$$0.31 < f2/f21 < 0.7 \ldots \quad (4)$$

here, vd21: Abbe number of the L21 negative lens at the d line
f2: focal length of the second lens group at the d line
f21: focal length of the L21 negative lens at the d line Next, numerical examples of the zoom lens 20 will be described. Table 5 shows basic lens data of the zoom lens 20, Table 6 shows data on specification, Table 7 shows data on changing surface distance, and Table 8 shows data on aspheric surface coefficients.

In the lens data of Table 6, the column of the surface number shows surface numbers that increase sequentially toward the image plane side, with the surface of an element closest to the object side being regarded as the first surface. The column of the curvature radius shows curvature radii of the respective surfaces. The column of the surface distance shows surface distances on the optical axis Z between the respective surfaces and the next surfaces. The column of nd shows the refractive indexes of respective optical elements at a d line (a wavelength of 587.6 nm), and the column of vd shows Abbe numbers of respective optical elements at the d line (a wavelength of 587.6 nm), and the column of θg,f shows the partial dispersion ratios of respective optical elements.

The partial dispersion ratio θg,f is expressed by the following expression.

$$\theta g,f=(Ng-NF)/(NF-NC)$$

here,
Ng: refractive index at the g line
NF: refractive index at the F line
NC: refractive index at the C line Here, reference signs of curvature radii are set to be positive in a case where the surface shapes are convex toward the object side, and reference signs of curvature radii are set to be negative in a case where of the surface shapes are convex toward the image plane side. The basic lens data includes an aperture stop St and optical members PP1 to PP3. In the column of a surface number of a surface corresponding to the stop St, the surface number and a term of (stop) are noted. Further, in the lens data of Table 6, DD [surface number] is described in the place of the surface distance in which the distance changes during zooming. The numerical values corresponding to DD [surface number] are shown in Table 8.

Values of a zoom magnification, a focal length f, a back focus Bf, an F value FNo., and a total angle of view 2ω are shown in data on the specification in Table 7.

In the lens data of Table 6, the reference sign * is attached to surface numbers of aspheric surfaces, and numerical values of the paraxial curvature radii are shown as the curvature radius of the aspheric surface. The data on the aspheric surface coefficients in Table 8 show surface numbers for the aspheric surfaces and the aspheric surface coefficients for the aspheric surfaces. The aspheric surface coefficients are values of the coefficients KA and Am (m=3 ... 20) in aspheric surface expression represented as the following expression.

$$Zd=C \cdot h^2/\{1+(1-KA \cdot C^2 \cdot h^2)^{1/2}\}+\Sigma Am \cdot h^m$$

here,
Zd: aspheric surface depth (a length of a perpendicular drawn from a point on an aspheric surface at height h to a plane that is perpendicular to the optical axis that contacts the vertex of the aspheric surface)
h: height (a distance from the optical axis)
C: reciprocal of paraxial curvature radius
KA, Am: aspheric surface coefficient (m=3 ... 20)

In the basic lens data, the data on specification, and the data on changing surface distance, a degree is used as a unit of an angle, and mm is used as a unit of a length, but since the optical system can be used with magnification and reduction in proportion, appropriate different units may be used.

TABLE 5

| Surface Number | Curvature Radius | Surface Distance | nd | vd | θg,f |
|---|---|---|---|---|---|
| 1 | 2149.2163 | 4.4000 | 1.83400 | 37.16 | 0.57759 |
| 2 | 364.4008 | 1.8100 | | | |
| 3 | 357.1559 | 24.5800 | 1.43387 | 95.18 | 0.53733 |
| 4 | −629.0299 | 32.8500 | | | |
| 5 | 363.8700 | 15.6200 | 1.43387 | 95.18 | 0.53733 |
| 6 | ∞ | 0.1200 | | | |
| 7 | 310.1672 | 17.8400 | 1.43387 | 95.18 | 0.53733 |
| 8 | ∞ | 2.9000 | | | |
| 9 | 173.0993 | 14.6700 | 1.43875 | 94.94 | 0.53433 |
| 10 | 310.0848 | DD[10] | | | |
| *11 | 109963.7968 | 2.8000 | 1.90366 | 31.31 | 0.59481 |
| 12 | 56.5266 | 8.6300 | | | |
| 13 | −84.6070 | 1.6000 | 2.00100 | 29.13 | 0.59952 |
| 14 | 321.4052 | 6.6700 | | | |
| 15 | −62.2824 | 1.6000 | 1.95375 | 32.32 | 0.59015 |
| 16 | 115.4560 | 6.9400 | 1.89286 | 20.36 | 0.83944 |
| 17 | −73.9497 | 0.1200 | | | |
| 18 | 962.3821 | 7.7100 | 1.80518 | 25.43 | 0.61027 |
| 19 | −51.3780 | 1.6200 | 1.80400 | 46.58 | 0.55730 |
| 20 | 2303.8825 | DD[20] | | | |
| 21 | 170.3657 | 9.7800 | 1.49700 | 81.54 | 0.53748 |
| *22 | −209.1383 | DD [22] | | | |
| 23 | 137.4359 | 11.9100 | 1.43700 | 95.10 | 0.53364 |
| 24 | −175.8090 | 2.0000 | 1.59270 | 35.31 | 0.59336 |
| 25 | −597.2019 | 0.2500 | | | |
| *26 | 188.3526 | 9.3100 | 1.43700 | 95.10 | 0.53364 |
| 27 | −195.4929 | 0.1200 | | | |
| 28 | 247.3158 | 2.0000 | 1.80000 | 29.84 | 0.60178 |
| 29 | 94.0850 | 12.0500 | 1.43700 | 95.10 | 0.53364 |
| 30 | −217.6314 | DD [30] | | | |
| 31(stop) | ∞ | 5.0700 | | | |
| 32 | −188.3440 | 1.4000 | 1.77250 | 49.60 | 0.55212 |
| 33 | 62.0923 | 0.1200 | | | |
| 34 | 43.4903 | 4.5500 | 1.80518 | 25.42 | 0.61616 |
| 35 | 151.4362 | 2.0300 | | | |
| 36 | −188.3403 | 1.4000 | 1.48749 | 70.24 | 0.53007 |
| 37 | 72.1812 | 9.2600 | | | |
| 38 | −50.3918 | 3.2500 | 1.80440 | 39.59 | 0.57297 |
| 39 | 63.9801 | 8.1300 | 1.80518 | 25.43 | 0.61027 |
| 40 | −46.8126 | 0.3400 | | | |
| 41 | −50.8827 | 1.6600 | 1.95375 | 32.32 | 0.59015 |
| 42 | 56.9580 | 7.3800 | 1.72916 | 54.68 | 0.54451 |
| 43 | −73.6910 | 0.1200 | | | |
| 44 | 215.7126 | 10.9800 | 1.73800 | 32.26 | 0.58995 |
| 45 | −215.7126 | 8.8100 | | | |
| 46 | 182.7540 | 17.0600 | 1.67003 | 47.23 | 0.56276 |
| 47 | −103.9363 | 0.1200 | | | |
| 48 | 148.7010 | 2.9000 | 1.95375 | 32.32 | 0.59015 |
| 49 | 44.8210 | 0.8500 | | | |
| 50 | 44.9406 | 10.1300 | 1.51633 | 64.14 | 0.53531 |
| 51 | −64.7286 | 0.1200 | | | |
| 52 | 65.6410 | 5.1900 | 1.48749 | 70.24 | 0.53007 |
| 53 | −65.6410 | 1.8500 | 1.95375 | 32.32 | 0.59015 |
| 54 | ∞ | 0.2500 | | | |
| 55 | ∞ | 1.0000 | 1.51633 | 64.14 | 0.53531 |
| 56 | ∞ | 0.0000 | | | |
| 57 | ∞ | 33.0000 | 1.60863 | 46.60 | 0.56787 |
| 58 | ∞ | 13.2000 | 1.51633 | 64.14 | 0.53531 |
| 59 | ∞ | 17.3299 | | | |

TABLE 6

| | Wide Angle End | Intermediate | Telephoto End |
|---|---|---|---|
| Zoom Magnification | 1.0 | 48.0 | 77.0 |
| f | 9.30 | 446.26 | 715.88 |
| Bf | 47.46 | 47.46 | 47.46 |
| FNo. | 1.76 | 2.27 | 3.64 |
| 2ω[°] | 65.0 | 1.4 | 0.8 |

TABLE 7

|  | Wide Angle End | Intermediate | Telephoto End |
|---|---|---|---|
| DD[10] | 2.8554 | 186.6407 | 191.1526 |
| DD[20] | 291.2076 | 26.4986 | 3.9764 |
| DD[22] | 1.4039 | 6.7033 | 1.9940 |
| DD[30] | 3.1233 | 78.7475 | 101.4671 |

TABLE 8

| Surface Number | 11 | 22 | 26 |
|---|---|---|---|
| KA | 1.0000000E+00 | 1.0000000E+00 | 1.0000000E+00 |
| A3 | −1.8505954E−21 | −7.1721817E−22 | 6.6507804E−22 |
| A4 | 4.0660287E−07 | 1.6421968E−07 | −2.8081272E−07 |
| A5 | −6.4796240E−09 | −5.6511999E−09 | −8.0962001E−09 |
| A6 | 8.4021729E−10 | 1.7414539E−10 | 2.8172499E−10 |
| A7 | −4.5016908E−11 | 7.4176985E−13 | −1.6052722E−12 |
| A8 | 4.3463314E−13 | −9.7299399E−14 | −1.0541094E−13 |
| A9 | 3.5919548E−14 | 1.1281878E−15 | 2.1399424E−15 |
| A10 | −8.9257498E−16 | −4.4848875E−19 | −1.0917621E−17 |

Here, it is preferable that the third lens group G3 and the fourth lens group G4, which are moving lens groups, include at least one aspheric lens, and the aspheric lens is the lens 1 shown in FIGS. 1 and 2. The on-axis rays wa is relatively thick in the third lens group G3 and the fourth lens group G4 and the aspheric lens composed of the lens 1 is included in the third lens group G3 and/or the fourth lens group G4, which makes it possible to effectively reduce the blurriness of the ring zone in any zoom range from the wide angle end to the telephoto end. In the lens data of Table 5, the lens L21 of the second lens group G2 having an aspheric optical surface indicated by surface number 11, the lens L31 of the third lens group G3 having an aspheric optical surface indicated by surface number 22, and the lens L43 of the fourth lens group G4 having an aspheric optical surface indicated by surface number 26 are composed of the lens 1.

Figure 14:
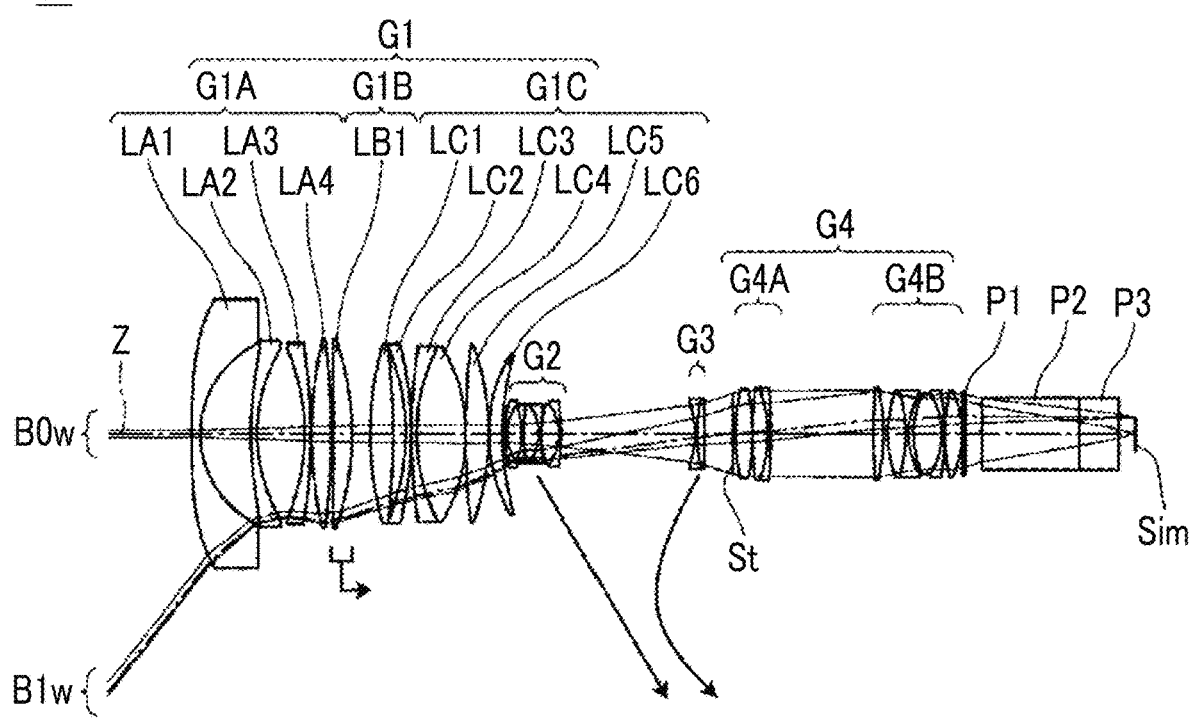
FIG. 14 is a schematic view of still another zoom lens comprising the lens of FIG. 1 in a state in which a focal length is at a wide angle end.
Figure 15:
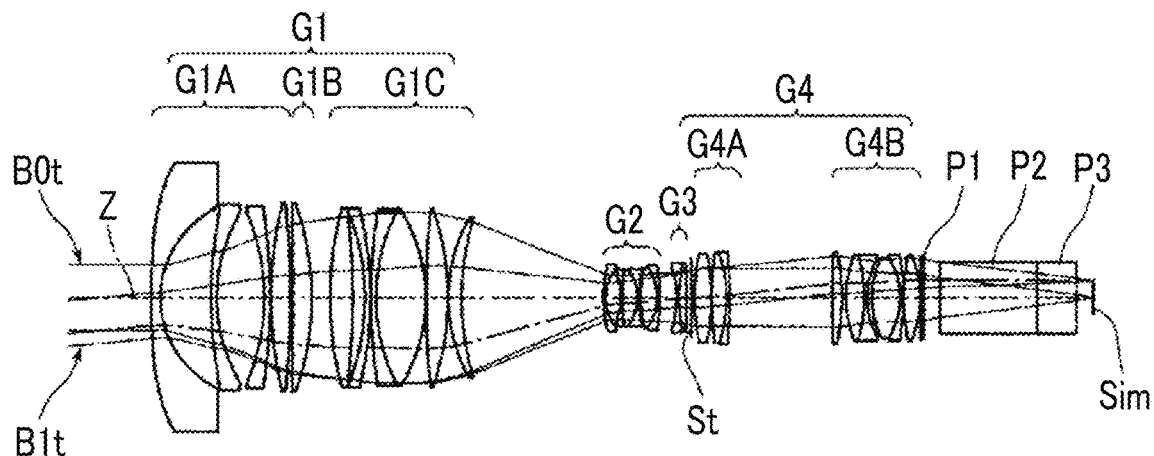
FIG. 15 is a schematic view of the zoom lens of FIG. 14 in a state in which the focal length is at a telephoto end.

FIGS. 14 and 15 show another example of the zoom lens comprising the lens 1.

FIG. 14 shows the state in which the focal length is at the wide angle end, and FIG. 15 shows the state in which the focal length is at the telephoto end. In FIGS. 14 and 15, an object at infinity is in focus, the left side is an object side, and the right side is an image side. In FIG. 14, the on-axis rays B0w and the off-axis rays B1w with the maximum angle of view at the wide angle end state are shown as the light paths, and in FIG. 15, the on-axis rays B0t and the off-axis rays B1t with the maximum angle of view at the telephoto end state are shown as the light paths.

The zoom lens 30 substantially consists of, in order from the object side to the image side along the optical axis Z, a first lens group G1 that has a positive refractive power and remains stationary with respect to an image plane Sim during zooming, a second lens group G2 that has a negative refractive power and moves in a direction of an optical axis during zooming, a third lens group G3 that has a negative refractive power and moves in the direction of the optical axis during zooming, an aperture stop St, and a fourth lens group G4 that has a positive refractive power and remains stationary with respect to the image plane Sim during zooming. It should be noted that the aperture stop St shown in FIGS. 14 and 15 does not necessarily represent the size or the shape thereof, and indicates a position of the stop on the optical axis Z.

In a case of applying the zoom lens 30 to an imaging apparatus, it is preferable to provide various filters, prisms, and/or a protective cover glass based on specification of the imaging apparatus. Therefore, FIGS. 14 and 15 show an example in which parallel flat plate-like optical members P1 to P3 assumed as the above members are disposed between the lens system and the image plane Sim. However, positions of the optical members P1 to P3 are not limited to those shown in FIGS. 14 and 15, and it is also possible to adopt a configuration in which at least one of the optical members P1 to P3 is omitted.

In the zoom lens 30, the second lens group G2 has a main zooming function, and the third lens group G3 performs correction of focal shift caused by zooming. During zooming from the wide angle end to the telephoto end, the second lens group G2 moves to the image side, the third lens group G3 moves to the object side, and then moves to the image side. The arrows below the second lens group G2 and the third lens group G3 in the upper part of FIG. 14 indicate the schematic movement loci of these lens groups during zooming from the wide angle end to the telephoto end.

The first lens group G1 substantially consists of, in order from the object side, a front group of the first lens group G1A that has a negative refractive power and remains stationary with respect to the image plane Sim during focusing, an intermediate group of the first lens group G1B that has a positive refractive power and moves to the image side during focusing from a distant object to a close-range object, and a rear group of the first lens group G1C that has a positive refractive power and remains stationary with respect to the image plane Sim during focusing. With such a configuration, it is possible to achieve the wide angle while favorably suppressing change (bleeding) in angle of view during focusing. The arrow below the intermediate group of the first lens group G1B in the upper part of FIG. 14 indicates the moving direction of the lens group during focusing from a distant object to a close-range object.

In the example shown in FIGS. 14 and 15, the front group of the first lens group G1A consists of four lenses LA1 to LA4 in order from the object side, the intermediate group of the first lens group G1B consists of only one lens LB1, and the rear group of the first lens group G1C consists of six lenses LC1 to LC6 in order from the object side.

The front group of the first lens group G1A is composed to include a plurality of negative lenses that are arranged successively from a position closest to the object side and a positive lens that is disposed to be closest to the image side. To provide a negative refractive power to a position closest to the object side is an advantageous in achieving the wide angle. To assign the negative refractive power on the object side to the plurality of negative lenses is advantageous in favorably correcting spherical aberration and off-axis aberrations caused by achieving the wide angle. In addition, since the front group of the first lens group G1A includes not only a negative lens but also a positive lens, chromatic aberration is easily balanced.

The front group of the first lens group G1A may be composed to substantially consist of, in order from the object side, two negative meniscus lenses convex toward the object side, a negative lens, and a positive lens. In such a case, it is possible to correct the spherical aberration on the telephoto side while suppressing fluctuation in off-axis aberrations caused by zooming and particularly suppressing fluctuation in distortion and/or suppressing fluctuation in field curvature.

The intermediate group of the first lens group G1B may be composed to substantially consist of only one positive lens. In such a case, since it is possible to ensure the amount of movement of the lens which moves during focusing, it becomes easy to suppress fluctuation in spherical aberration caused by focusing. In addition, it is possible to reduce the weight of the lens group that moves during focusing.

The rear group of the first lens group G1C is composed to include one or more negative lenses having concave surface facing toward the object side. With this configuration, it is possible to effectively correct spherical aberration occurring on the telephoto side.

It is preferable that the rear group of the first lens group G1C has, successively in order from the position closest to the object side, a biconvex lens, and a negative meniscus lens having concave surface facing toward the object side. In such a case, it is possible to effectively correct field curvature on the wide angle side while correcting spherical aberration on the telephoto side.

The rear group of the first lens group G1C may be composed to substantially consist of, in order from the object side, a biconvex lens, a negative meniscus lens having concave surface facing toward the object side, a cemented lens in which a negative lens and a positive lens are cemented in order from the object side, and one or more positive lenses. In such a case, the positive spherical aberration generated by the negative refractive power of the front group of the first lens group G1A can be corrected by the positive lens in the rear group of the first lens group G1C, and the negative spherical aberration that is overcorrected can be corrected by the cemented surface of the cemented lens in the rear group of the first lens group G1C. The rear group of the first lens group G1C has, in order from the object side, a biconvex lens and a negative meniscus lens having concave surface facing toward the object side, which makes it possible to effectively correct field curvature on the wide angle side while correcting spherical aberration.

In a case where the rear group of the first lens group G1C substantially consist of, in order from the object side, a biconvex lens, a negative meniscus lens having concave surface facing toward the object side, a cemented lens in which a negative lens and a positive lens are cemented in order from the object side, and one or more positive lenses, the rear group of the first lens group G1C may be composed to substantially consist of six lenses. That is, the rear group of the first lens group G1C may be composed to substantially consist of, in order from the object side, a biconvex lens, a negative meniscus lens having concave surface facing toward the object side, a cemented lens in which a negative lens and a positive lens are cemented in order from the object side, and two positive lenses. In such a case, it is advantageous in correcting spherical aberration more favorably than the case where the rear group of the first lens group G1C has only one positive lens closer to the image side than the cemented lens, and for reduction in size and cost of the lens system as compared with the case where the rear group of the first lens group G1C has three or more positive lenses closer to the image side than the cemented lens.

Then, the zoom lens is composed to satisfy Conditional Expression (5).

$$65 < vn1A2 < 110 \quad (5)$$

here,
vn1A2: an Abbe number of a second negative lens from the object side in the front group of the first lens group at the d line By satisfying Conditional Expression (5), it is possible to suppress lateral chromatic aberration occurring in the entire zoom range, particularly in the peripheral portion of the imaging region. By not allowing the value of Conditional Expression (5) to be equal to or less than the lower limit, it becomes easy to correct lateral chromatic aberration occurring in the entire zoom range, particularly in the peripheral portion of the imaging region. By not allowing the value of Conditional Expression (5) to be equal to or greater than the upper limit, it becomes easy to select a material having a relatively high refractive index as the material of the second negative lens from the object side, and as a result, it becomes easy to suppress distortion and field curvature.

Next, numerical examples of a zoom lens 30 will be described. Table 9 shows basic lens data of the zoom lens 30, Table 10 shows specification and variable surface distances during zooming, and Table 11 shows aspheric surface coefficients.

In Table 9, the column of Si shows a surface number i (i=1, 2, 3, . . . ) attached to an i-th surface of the elements, where i sequentially increases toward the image side in a case where an object side surface of an element closest to the object side is regarded as a first surface. The column of Ri shows a curvature radius of the i-th surface. The column of Di shows a surface distance on the optical axis Z between the i-th surface and an i+1-th surface. In Table 9, the column of Ndj shows a refractive index of a j-th (j=1, 2, 3, . . . ) element at the d line (a wavelength of 587.6 nm), where j sequentially increases toward the image side in a case where the element closest to the object side is regarded as the first element. The column of vdj shows an Abbe number of the j-th element based on a d line.

Here, reference signs of radii of curvature of surface shapes convex toward the object side are set to be positive, and reference signs of radii of curvature of surface shapes convex toward the image side are set to be negative. Table 9 additionally shows the aperture stop St and the optical members P1 to P3. In Table 9, in a place of a surface number of a surface corresponding to the aperture stop St, the surface number and a term of (St) are noted. A value at the bottom place of Di indicates a distance between the image plane Sim and the surface closest to the image side in the table. In Table 9, the variable surface distances, which are variable during zooming, are referenced by the reference signs DD[ ], and are written into places of Di, where object side surface numbers of distances are noted in [ ]. Further, in Table 9, regarding the variable surface distances, which change during focusing, the term (INF) and surface distances in a state where the object at infinity is in focus are noted.

In Table 10, values of the zoom ratio Zr, the focal length f of the whole system, the back focal length Bf in terms of the air conversion distance, the F number FNo., the maximum total angle of view 2ω, and the variable surface distance are shown based on the d line. (°) in the place of 2ω indicates that the unit thereof is a degree. In Table 10, values in the wide angle end state are shown in the column labeled by WIDE, and values in the telephoto end state are shown in the column labeled by TELE. The values in Tables 9 and 10 are values in a state where the object at infinity is in focus.

In Table 9, the reference sign * is attached to surface numbers of aspheric surfaces, and numerical values of the paraxial radius of curvature are written into the column of the radius of curvature of the aspheric surface. Table 11 shows aspheric surface coefficients of the aspheric surfaces. The "E−n" (n: an integer) in numerical values of the aspheric surface coefficients of Table 11 indicates "×10$^{-n}$". The aspheric surface coefficients are values of the coefficients KA and Am (m=4, 6, 8, . . . ) in aspheric surface expression represented as the following expression.

$$Zd = \frac{C \times h^2}{1 + \sqrt{1 - KA \times C^2 \times h^2}} + \sum_m Am \times h^m$$

here,

Zd: aspheric surface depth (a length of a perpendicular drawn from a point on an aspheric surface at height h to a plane that is perpendicular to the optical axis that contacts the vertex of the aspheric surface)

h: a height (a distance from the optical axis to the lens surface)

C: reciprocal of paraxial curvature radius

KA and Am: aspheric surface coefficients

In data of each table, a degree is used as a unit of an angle, and mm is used as a unit of a length, but since the optical system can be used with magnification and reduction in proportion, appropriate different units may be used. Further, each of the following tables shows numerical values rounded off to predetermined decimal places.

TABLE 9

| Si | Ri | Di | Ndj | vdj |
|---|---|---|---|---|
| *1 | 641.66259 | 3.000 | 1.80100 | 34.97 |
| 2 | 33.75559 | 17.000 | | |
| *3 | 123.74146 | 2.000 | 1.49700 | 81.54 |
| 4 | 56.40159 | 16.000 | | |
| 5 | −72.32584 | 1.930 | 1.95375 | 32.32 |
| 6 | −202.10991 | 0.300 | | |
| 7 | 136.61972 | 6.580 | 1.84666 | 23.78 |
| 8 | −277.46991 | 0.75(INF) | | |
| 9 | −2306.32677 | 6.350 | 1.53775 | 74.70 |
| 10 | −94.09392 | 6.161(INF) | | |
| 11 | 114.6)313 | 7.660 | 1.43875 | 94.66 |
| *12 | −181.77945 | 4.121 | | |
| 13 | −77.04720 | 1.800 | 1.80100 | 34.97 |
| 14 | −126.53361 | 0.120 | | |
| 15 | 184.93960 | 1.800 | 1.95375 | 32.32 |
| 16 | 64.49500 | 16.610 | 1.43875 | 94.66 |
| 17 | −57.48031 | 0.120 | | |
| 18 | 266.75570 | 7.670 | 1.43387 | 95.18 |
| 19 | −90.09519 | 0.120 | | |
| 20 | 54.93968 | 4.520 | 1.72916 | 54.68 |
| 21 | 95.88929 | DD[21] | | |
| 22 | 39.58867 | 0.800 | 2.00100 | 29.13 |
| 23 | 15.50502 | 4.869 | | |
| 24 | −33.46164 | 0.800 | 1.91082 | 35.25 |
| 25 | 81.63500 | 5.020 | 1.80518 | 25.42 |
| 26 | −15.76600 | 0.810 | 1.77250 | 49.60 |
| 27 | 73.45119 | 0.120 | | |
| 28 | 34.32104 | 5.740 | 1.69895 | 30.13 |
| 29 | −17.41600 | 0.800 | 1.95375 | 32.32 |
| 30 | −74.84673 | DD[30] | | |
| 31 | −33.54980 | 0.810 | 1.72916 | 54.68 |
| 32 | 59.17000 | 2.390 | 1.84661 | 23.88 |
| 33 | −1406.19640 | DD[33] | | |
| 34(St) | ∞ | 1.000 | | |
| *35 | 64.73762 | 5.710 | 1.80610 | 40.88 |
| 36 | −72.62275 | 0.120 | | |
| 37 | 131.85587 | 5.180 | 1.51742 | 52.43 |
| 38 | −44.21500 | 1.000 | 1.95375 | 32.32 |
| 39 | −230.81910 | 34.525 | | |
| 40 | 251.98617 | 3.390 | 1.84661 | 23.88 |
| 41 | −68.85375 | 1.398 | | |
| 42 | 41.85229 | 6.010 | 1.58913 | 61.13 |
| 43 | −51.64100 | 1.000 | 1.95375 | 32.32 |
| 44 | 26.58227 | 1.645 | | |
| 45 | 30.92090 | 9.460 | 1.53775 | 74.70 |
| 46 | −26.31100 | 1.000 | 1.95375 | 32.32 |
| 47 | −89.90422 | 0.120 | | |
| 48 | 69.93761 | 5.690 | 1.48749 | 70.24 |
| 49 | −35.79182 | 0.200 | | |
| 50 | ∞ | 1.000 | 1.51633 | 64.14 |
| 51 | ∞ | 5.419 | | |
| 52 | ∞ | 33.000 | 1.60859 | 46.44 |
| 53 | ∞ | 13.200 | 1.51633 | 64.05 |
| 54 | ∞ | 5.503 | | |

TABLE 10

| | WIDE | TELE |
|---|---|---|
| Zr | 1.0 | 12.6 |
| f | 4.668 | 58.586 |
| Bf | 41.002 | 41.002 |
| FNo. | 1.86 | 2.67 |
| 2ω(°) | 105.2 | 10.8 |
| DD[21] | 0.726 | 47.183 |
| DD[30] | 44.474 | 5.772 |
| DD[33] | 9.480 | 1.725 |

TABLE 11

| Surface Number | 1 | 3 | 12 | 35 |
|---|---|---|---|---|
| KA | 1.0000000E+00 | 1.0000000E+00 | 1.0000000E+00 | 1.0000000E+00 |
| A4 | 2.1935986E−06 | −4.8514385E−07 | 1.2227839E−06 | −2.8441059E−06 |
| A6 | −5.0602429E−10 | −8.4353254E−11 | −9.0152102E−11 | −6.5929982E−11 |
| A8 | 9.2543372E−14 | −1.8537680E−12 | −3.6643047E−13 | 2.5648563E−11 |
| A10 | −2.1340794E−17 | 2.7757879E−15 | 1.2047269E−15 | −3.2693830E−13 |
| A12 | 1.3094908E−20 | −5.6973394E−18 | −4.2351771E−18 | 2.5112072E−15 |
| A14 | −8.8381246E−25 | 1.1850385E−20 | 9.0596803E−21 | −1.1779118E−17 |
| A16 | −2.7337631E−27 | −1.3306500E−23 | −1.1002102E−23 | 3.2475601E−20 |
| A18 | 1.2809320E−30 | 7.2223093E−27 | 7.0253554E−27 | −4.8092328E−23 |
| A20 | −1.8339686E−34 | −1.5476582E−30 | −1.8330673E−30 | 2.9425260E−26 |

Here, it is preferable that the first lens group G1 and the fourth lens group G4, which are stationary lens groups, include at least one aspheric lens, and the aspheric lens is the lens 1 shown in FIGS. 1 and 2. At the telephoto end, the on-axis rays B0$t$ is relatively thick in the first lens group G1 and the fourth lens group G4 and the aspheric lens composed of the lens 1 is included in the first lens group G1 and/or the fourth lens group G4, which makes it possible to effectively reduce the blurriness of the ring zone at telephoto end. In the lens data of Table 9, the lens LA1 of the first lens group G1 having an aspheric optical surface indicated by surface number 1, the lens LA2 of the first lens group G1 having an aspheric optical surface indicated by surface number 3, the lens LC1 of the first lens group G1 having an aspheric optical surface indicated by surface number 12, and the lens of the fourth lens group G4 having an aspheric optical surface indicated by surface number 35 are composed of the lens 1.

Figure 16:
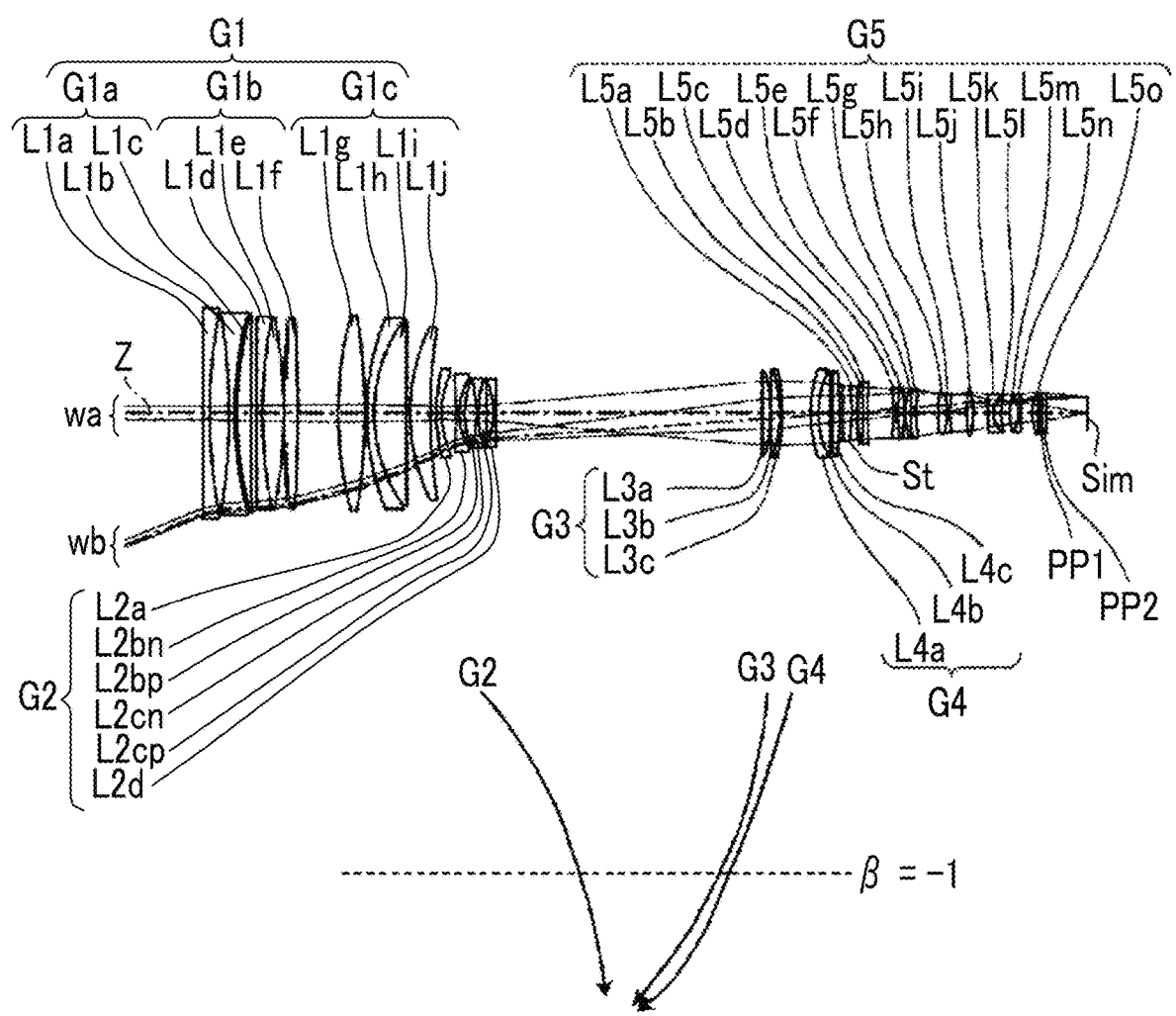
FIG. 16 is a schematic view of still another zoom lens comprising the lens of FIG. 1 in a state in which a focal length is at a wide angle end.
Figure 17:
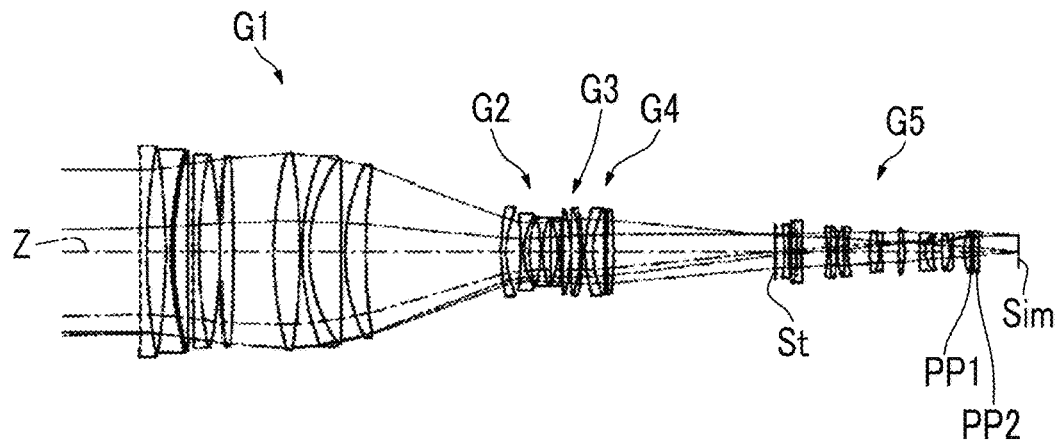
FIG. 17 is a schematic view of the zoom lens of FIG. 16 in a state in which the focal length is at a telephoto end.

FIGS. 16 and 17 show another example of the zoom lens comprising the lens 1.

FIG. 16 shows the state in which the focal length is at the wide angle end, and FIG. 17 shows the state in which the focal length is at the telephoto end. In FIGS. 16 and 17, the left side is the object side and the right side is the image side. Further, in FIG. 16, an arrow indicating a movement locus of each lens group during zooming from the wide angle end to the telephoto end, a point at which the imaging magnification is −1 (in the figure, horizontal dotted line indicated by β=−1), the on-axis rays wa and the rays wb at the maximum angle of view are shown together.

The zoom lens 40 substantially consists of, in order from the object side, a first lens group G1 having a positive refractive power, a second lens group G2 having a negative refractive power, and a third lens group G3 having a positive refractive power, a fourth lens group G4 having a positive refractive power, an aperture stop St, and a fifth lens group G5 having a positive refractive power. During zooming, the first lens group G1 is stationary with respect to the image plane Sim. During zooming from the wide angle end to the telephoto end, the distance between the first lens group G1 and the second lens group G2 is always widened, the distance between the second lens group G2 and the third lens group G3 is always narrowed, and the distance between the third lens group G3 and the fourth lens group G4 is narrower at the telephoto end than at the wide angle end. It should be noted that the aperture stop St shown in FIGS. 15 and 16 does not necessarily represent the size and the shape thereof, and indicates a position of the aperture stop on the optical axis Z.

In a case of applying the zoom lens 40 to an imaging apparatus, it is preferable to dispose a cover glass, a prism, and/or various filters such as an infrared cut filter and a low pass filter, between the optical system and the image plane Sim according to the configuration of the camera on which the lens is mounted. Therefore, FIGS. 16 and 17 show an example in which parallel flat plate-like optical members PP1 and PP2 assumed as the above members are disposed between the lens system and the image plane Sim.

With such a configuration, since the third lens group G3 and the fourth lens group G4 correct the fluctuation in the position of the image plane caused by zooming of the second lens group G2 that operates on zooming and move relative to each other, it is possible to correct field curvature of the image plane during zooming and possible to favorably correct fluctuation in the spherical aberration during zooming.

In addition, with the configuration in which movement is performed such that the distance between the third lens group G3 and the fourth lens group G4 is narrower on the telephoto side than on the wide angle side, the movement range of the second lens group G2 on the telephoto side can be made wide and the refractive power of the second lens group G2 can be suppressed. In this way, it is possible to suppress aberration fluctuation accompanied by zooming.

In addition, the second lens group G2 substantially consists of, in order from the object side, a first lens component, a second lens component, a third lens component, and a fourth lens component. The first lens component is a second a negative lens L2$a$ with the concave surface facing toward the image side, the absolute value of the curvature radius of the surface being smaller than that of the surface on the object side. The second lens component is a cemented lens in which a second bn biconcave lens L2$bn$ and a second bp positive meniscus lens L2$bp$ are cemented in order from the object side and which has a negative refractive power as a whole. The third lens component is a cemented lens in which a second cn biconcave lens L2$cn$ and a second cp positive lens L2$cp$ are cemented in order from the object side. The fourth lens component is a second d negative lens L2$d$ with a concave surface facing toward the object side, the absolute value of the curvature radius of the surface being smaller than that of the surface on the image side.

Since, in a case where the second lens group G2 has more than four lens components, the moving range of the second lens group G2 becomes difficult to be obtained, and in a case where the second lens group G2 has less than four lens components, suppression of various aberrations becomes difficult, the second lens group G2 is composed of four lens components. In this way, it is possible to achieve both the securing of the moving range of the second lens group G2 and the suppressing of various aberrations.

Further, in order to achieve high magnification, the principal point position of the second lens group G2 needs to be closer to the object side, so it is necessary to increase the number of negative lenses in the second lens group G2.

By composing the first lens component as described above, it is possible to suppress occurrence of distortion and astigmatism on the wide angle side.

By arranging a negative lens on the image side of the second lens component, it is possible to make the principal point position close to the object side. However, since lateral chromatic aberration tends to occur on the wide angle side, the second lens component is set to be a cemented lens in which the second bn biconcave lens L2$bn$ and the second bp positive meniscus lens L2$bp$ are cemented as described above and have a negative refractive power as a whole, which makes possible to correct the lateral chromatic aberration while making the principal point position close to the object side. Further, by making the image side of the second bp positive meniscus lens L2$bp$ concave, there is an advantage in achieving the wide angle.

Since the image side of the second lens component is concave, it is possible to suppress occurrence of spherical aberration on the telephoto side by setting a lens concave toward the object side to be arranged closest to the object side, with respect to the third lens component. Further, by using a cemented lens of the second cn biconcave lens L2$cn$ and the second cp positive lens L2$cp$, it is possible to correct longitudinal chromatic aberration on the telephoto side.

Since the object side of the fourth lens component is concave, the fourth lens component works for correcting astigmatism generated by the first lens group G1 on the wide angle side while suppressing occurrence of spherical aberration on the telephoto side. In addition, since the fourth lens component is a negative lens, the fourth lens component works for strengthening a negative refractive power of the whole second lens group G2.

In the zoom lens, it is preferable that the fifth lens group G5 remains stationary with respect to the image plane Sim during zooming, and a third-fourth composite lens group formed by joining the third lens group G3 and the fourth lens group G4 and the second lens group G2 simultaneously pass through a point at which respective imaging magnifications are −1 during zooming from the wide angle end to the telephoto end. With such a configuration, it is possible to increase the zoom ratio without the third lens group G3 returning to the image side during zooming from the wide angle end to the telephoto end.

Next, numerical examples of a zoom lens 40 will be described. Table 12 shows basic lens data of the zoom lens 40, Table 13 shows data on specification, Table 14 shows data on the surface distance in which the distance changes during zooming, and Table 15 shows data on aspheric surface coefficients.

In the lens data of Table 12, the column of the surface number shows a surface number that sequentially increases toward the image side, with the surface of an element closest to the object side being regarded as the first surface. The column of the curvature radius shows curvature radii of the respective surfaces. The column of the surface distance shows surface distances on the optical axis Z between the respective surfaces and the next surfaces. The column of nd shows the refractive indexes of respective optical elements at the d line (a wavelength of 587.6 nm), and the column of νd shows Abbe numbers of respective optical elements at the d line (a wavelength of 587.6 nm), and the column of θgF shows the partial dispersion ratios of respective optical elements.

The partial dispersion ratio θgF is expressed by the following expression.

$$\theta gF=(ng-nF)/(nF-nC)$$

here,
ng: refractive index at the g line
nF: refractive index at the F line
nC: refractive index at the C line Here, reference signs of curvature radii are set to be positive in a case where the surface shapes are convex toward the object side, and reference signs of curvature radii are set to be negative in a case where the surface shapes are convex toward the image side. The basic lens data includes an aperture stop St and optical members PP1 and PP2. In the place of a surface number of a surface corresponding to the aperture stop St, the surface number and a term of (stop) are noted. Further, in the lens data of Table 12, DD [surface number] is described in the place of the surface distance in which the distance changes during zooming. The numerical values corresponding to DD [surface number] are shown in Table 14.

Values of a zoom magnification, a focal length f′, an F value FNo., and a total angle of view 2ω are shown in data on the specification in Table 13.

In the basic lens data, the data on specification, and the data on changing surface distance, a degree is used as a unit of an angle, and mm is used as a unit of a length, but since the optical system can be used with magnification and reduction in proportion, appropriate different units may be used.

In the lens data of Table 12, the reference sign * is attached to surface numbers of aspheric surfaces, and numerical values of the paraxial curvature radii are shown as the curvature radius of the aspheric surface. The data on the aspheric surface coefficients in Table 15 show surface numbers for the aspheric surfaces and the aspheric surface coefficients for the aspheric surfaces. The "E±n" (n: an integer) in numerical values of the aspheric surface coefficients indicates "×10$^{±n}$". The aspheric surface coefficients are values of the coefficients KA and Am (m=3 . . . 16) in aspheric expression represented as the following expression.

$$Zd=C\cdot h^2/\{1+(1-KA\cdot C^2\cdot h^2)^{1/2}\}+\Sigma Am\cdot h^m$$

here,
Zd: aspheric surface depth (a length of a perpendicular drawn from a point on an aspheric surface at height h to a plane that is perpendicular to the optical axis that contacts the vertex of the aspheric surface)
h: height (a distance from the optical axis)
C: reciprocal of paraxial curvature radius
KA, Am: aspheric surface coefficient (m=3 . . . 16)

TABLE 12

| Surface Number | Curvature Radius | Surface Distance | nd | vd | θgF |
|---|---|---|---|---|---|
| 1 | −13378.35006 | 5.977 | 1.77250 | 49.60 | 0.55212 |
| 2 | 506.33763 | 16.475 | | | |
| 3 | −584.49773 | 4.800 | 1.80400 | 46.58 | 0.55730 |
| 4 | 335.43813 | 2.500 | | | |
| 5 | 349.09925 | 12.000 | 1.84139 | 24.56 | 0.61274 |
| 6 | 8435.34081 | 4.877 | | | |
| 7 | 7849.07545 | 5.000 | 1.80000 | 29.84 | 0.60178 |
| 8 | 439.82608 | 18.270 | 1.49700 | 81.54 | 0.53748 |
| 9 | −444.99046 | 0.125 | | | |
| 10 | 1000.00000 | 10.877 | 1.63246 | 63.77 | 0.54215 |
| 11 | −1249.86489 | 34.999 | | | |
| 12 | 336.67292 | 23.000 | 1.43387 | 95.18 | 0.53733 |
| 13 | −555.44540 | 1.838 | | | |
| 14 | 224.29284 | 6.264 | 1.63980 | 34.47 | 0.59233 |
| 15 | 143.35462 | 28.031 | 1.43875 | 94.94 | 0.53433 |
| 16 | 8626.60879 | 3.144 | | | |
| 17 | 176.57760 | 17.500 | 1.49700 | 81.54 | 0.53748 |
| 18 | 475.02631 | DD[18] | | | |
| 19 | 182.61414 | 4.500 | 1.95375 | 32.32 | 0.59015 |
| 20 | 86.38802 | 12.791 | | | |
| 21 | −331.30207 | 3.073 | 1.55032 | 75.50 | 0.54001 |
| 22 | 61.69495 | 4.501 | 1.54814 | 45.78 | 0.56859 |
| 23 | 78.10163 | 9.831 | | | |
| 24 | −145.36707 | 2.145 | 1.49700 | 81.54 | 0.53748 |
| 25 | 96.62937 | 7.000 | 1.84139 | 24.56 | 0.61274 |
| 26 | −687.33596 | 5.926 | | | |
| 27 | −76.16819 | 2.130 | 1.43875 | 94.94 | 0.53433 |
| 28 | 1644.59414 | DD[28] | | | |
| 29 | 4104.02749 | 7.091 | 1.43875 | 94.66 | 0.53402 |
| 30 | −137.72084 | 0.177 | | | |
| 31 | 2020.97885 | 7.824 | 1.43875 | 94.66 | 0.53402 |
| 32 | −125.76283 | 2.257 | 1.94692 | 32.77 | 0.58862 |
| 33 | −185.59421 | DD[33] | | | |
| 34 | 124.45199 | 6.891 | 1.80390 | 32.49 | 0.59305 |
| 35 | 90.80287 | 10.021 | 1.43875 | 94.66 | 0.53402 |
| 36 | −49972.97817 | 2.118 | | | |
| 37 | 817.29840 | 6.060 | 1.43875 | 94.66 | 0.53402 |
| *38 | −343.72331 | DD[38] | | | |
| 39 (stop) | ∞ | 7.705 | | | |
| 40 | −170.68031 | 4.420 | 1.51793 | 61.26 | 0.54257 |
| 41 | 1424.66641 | 1.393 | | | |
| 42 | 854.58215 | 4.351 | 1.84139 | 24.56 | 0.61274 |
| 43 | −298.35856 | 3.656 | 1.83481 | 42.72 | 0.56486 |
| 44 | 408.16101 | 22.581 | | | |
| 45 | −124.70799 | 2.963 | 1.63723 | 35.15 | 0.58660 |
| 46 | 545.65832 | 5.104 | 1.84139 | 24.56 | 0.61274 |
| 47 | −188.00072 | 0.570 | | | |
| 48 | 59.62634 | 5.814 | 1.73532 | 53.96 | 0.54449 |
| 49 | 1199.51213 | 3.520 | 1.72395 | 29.02 | 0.60094 |
| 50 | 86.05183 | 19.251 | | | |
| 51 | 144.47442 | 7.880 | 1.74356 | 40.77 | 0.57416 |
| 52 | −63.44339 | 2.500 | 1.92486 | 36.38 | 0.57719 |

TABLE 12-continued

| Surface Number | Curvature Radius | Surface Distance | nd | vd | θgF |
|---|---|---|---|---|---|
| 53 | 99.00655 | 14.855 | | | |
| 54 | 342.36858 | 5.042 | 1.84139 | 24.56 | 0.61274 |
| 55 | −97.66651 | 13.086 | | | |
| 56 | 222.75255 | 4.531 | 1.52189 | 50.90 | 0.55751 |
| 57 | 21.13645 | 6.601 | 1.49700 | 81.54 | 0.53748 |
| 58 | 48.14182 | 8.035 | | | |
| 59 | 95.08701 | 6.958 | 1.49700 | 81.54 | 0.53748 |
| 60 | −37.48307 | 2.876 | 1.95375 | 32.32 | 0.59015 |
| 61 | −260.67641 | 9.976 | | | |
| 62 | 55.91542 | 4.808 | 1.53515 | 57.90 | 0.54800 |
| 63 | −387.96848 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.14 | 0.53531 |
| 67 | ∞ | 35.589 | | | |

TABLE 13

| | Wide Angle End | Intermediate | Telephoto End |
|---|---|---|---|
| Zoom Magnification | 1.0 | 3.8 | 19.8 |
| F' | 34.993 | 134.373 | 692.862 |
| FNo. | 2.85 | 2.85 | 4.85 |
| 2ω[°] | 44.8 | 11.8 | 2.4 |

TABLE 14

| | Wide Angle End | Intermediate | Telephoto End |
|---|---|---|---|
| DD[18] | 5.430 | 85.787 | 118.419 |
| DD[28] | 231.414 | 131.867 | 2.255 |
| DD[33] | 24.452 | 5.861 | 2.307 |
| DD[38] | 2.654 | 40.435 | 140.970 |

TABLE 15

| Surface Number | 38 |
|---|---|
| KA | −6.0660447E+00 |
| A3 | 0.0000000E+00 |
| A4 | −2.8516819E−09 |
| A5 | −3.7645381E−10 |
| A6 | 5.1922095E−11 |
| A7 | −1.9515833E−13 |
| A8 | 4.9687016E−14 |
| A9 | −1.0574536E−14 |
| A10 | 2.5263117E−17 |
| A11 | 2.5847685E−17 |
| A12 | −7.1492956E−19 |
| A13 | 3.0977491E−21 |
| A14 | −1.5830950E−22 |
| A15 | 9.3185221E−24 |
| A16 | −1.0801038E−25 |

Here, it is preferable that the third lens group G3 and the fourth lens group G4, which are moving lens groups, include at least one aspheric lens, and the aspheric lens is the lens 1 shown in FIGS. 1 and 2. The on-axis rays wa is relatively thick in the third lens group G3 and the fourth lens group G4 and the aspheric lens composed of the lens 1 is included in the third lens group G3 and/or the fourth lens group G4, which makes it possible to effectively reduce the blurriness of the ring zone in any zoom range from the wide angle end to the telephoto end. In the lens data of Table 12, the lens L4c of the fourth lens group G4 having aspheric optical surfaces indicated by the surface number 38 is composed of the lens 1.

Figure 18:
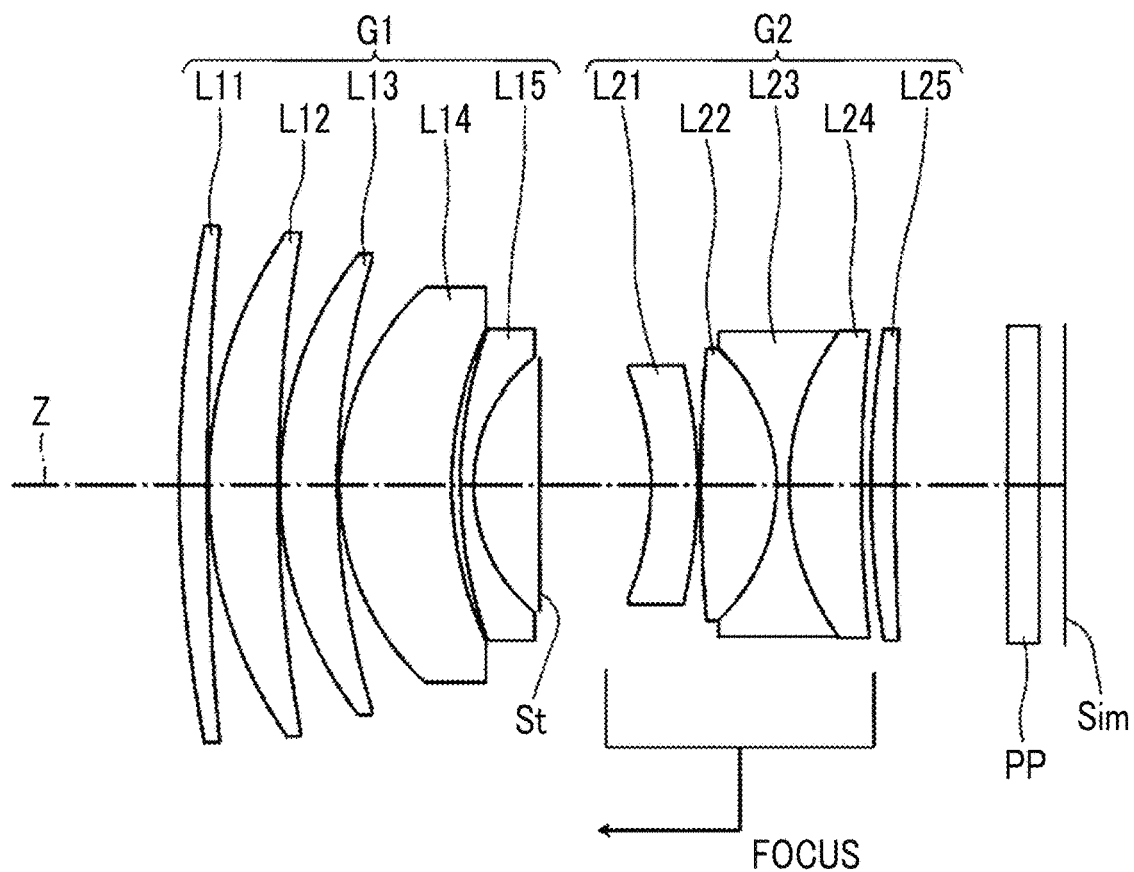
FIG. 18 is a schematic view of an imaging lens comprising the lens of FIG. 1.

FIG. 18 shows an example of an imaging lens comprising the lens of FIG. 1.

In FIG. 18, the left side is the object side and the right side is the image side.

The imaging lens 50 shown in FIG. 18 is substantially composed of, in order from the object side along the optical axis Z, the first lens group G1 that has a positive refractive power, the stop St, and the second lens group G2 that has a positive refractive power.

In a case of applying the imaging lens 50 to an imaging apparatus, it is preferable to dispose a cover glass, a prism, and various filters such as an infrared cut filter and a low pass filter between the optical system and the image plane Sim according to the configuration of the camera on which the lens is mounted. Therefore, FIG. 18 shows an example in which parallel flat plate-like optical members PP assumed as the above member are disposed between the lens system and the image plane Sim.

The first lens group G1 is composed to include, in order from the object side, two continuous positive lenses and a negative lens L15 having concave surface facing toward the image side.

The second lens group G2 is composed to include, in order from the object side, a lens L21 having at least one aspheric surface, and a three-piece cemented lens in which a positive lens L22 convex toward the image side, a negative lens L23, and a positive lens L24 are cemented in order from the object side, and the three-piece cemented lens has a positive refractive power.

As described above, in the lens system consisting of, in order from the object side, the first lens group G1 having a positive refractive power, the stop St, and the second lens group G2 having a positive refractive power, since the lens compositions of the first lens group G1 and the second lens group G2 are suitably set, it is possible to set the imaging lens to have a high optical performance, where the total length is short, the aperture is large, and various aberrations, including spherical aberration and chromatic aberration, are favorably corrected.

Further, by arranging a Gaussian type composed of two continuous positive lenses and a negative lens L15 having concave surface facing toward the image side on the object side of the stop St, spherical aberration is favorably corrected, and by arranging the aspheric lens L21 and the three-piece cemented lens (L22 to L24) on the image side of the stop St, spherical aberration, longitudinal chromatic aberration, and lateral chromatic aberration are favorably corrected.

By arranging the aspheric lens L21 in the vicinity of the image side of the stop St, the spherical aberration can be corrected without making a strong concave surface, which makes it possible to prevent the back focus from extending.

Further, since the cemented lens is composed of the positive lens L22, the negative lens L23, and the positive lens L24, it is possible to achieve good correction without causing total reflection of rays between the respective lenses. In addition, in the three-piece cemented lens, two positive lenses are arranged at both ends in order to have a positive refractive power, and thus respective aberrations can be assigned to two positive lenses.

In the imaging lens 50, in focus adjustment from an object at infinity to a close-range object, it is preferable that the first lens group G1 remains stationary with respect to the image plane. In this way, focusing is performed only by the whole or a part of the second lens group G2, and the weight of the moving lens can be reduced as compared with the case where focusing is performed also including the first lens group G1. Therefore, an improvement in focus speed can be expected.

Next, numerical examples of the imaging lens 50 will be described. Table 16 shows basic lens data of the imaging lens 50, Table 17 shows data on specification, and Table 18 shows data on aspheric surface coefficients.

In the lens data of Table 16, the column of the surface number shows a surface number that sequentially increases toward the image side, with the surface of an element closest to the object side being regarded as the first surface. The column of the curvature radius shows curvature radii of the respective surfaces. The column of the distance shows distances on the optical axis Z between the respective surfaces and the next surfaces. The column of nd shows the refractive indexes of respective optical elements at a d line (a wavelength of 587.6 nm), and the column of vd shows Abbe numbers of respective optical elements at the d line (a wavelength of 587.6 nm), and the column of θgF shows the partial dispersion ratios of respective optical elements.

Reference signs of curvature radii are set to be positive in a case where the surface shapes are convex toward the object side, and reference signs of curvature radii are set to be negative in a case where of the surface shapes are convex toward the image side. The basic lens data also includes the stop St. In the column of a surface number of a surface corresponding to the stop St, the surface number and a term of (stop) are noted.

Values of a focal length f, a back focus BF, a total angle of view 2ω, and an F value FNo. are shown in data on the specification in Table 17.

In the lens data of Table 16, the reference sign * is attached to surface numbers of aspheric surfaces, and numerical values of the paraxial curvature radii are shown as the curvature radius of the aspheric surface. The data on the aspheric surface coefficients in Table 18 show surface numbers for the aspheric surfaces and the aspheric surface coefficients for the aspheric surfaces. The aspheric surface coefficients are values of the coefficients K and Am (m=3, 4, 5 . . . 20) in aspheric surface expression represented as the following expression.

$$Zd = C \cdot h^2 / \{1 + K \cdot C^2 \cdot h^2)^{1/2}\} + \Sigma Am \cdot h^m$$

here,

Zd: aspheric surface depth (a length of a perpendicular drawn from a point on an aspheric surface at height h to a plane that is perpendicular to the optical axis that contacts the vertex of the aspheric surface)

h: height (a distance from the optical axis)

C: reciprocal of paraxial curvature radius

K and Am: aspheric surface coefficients (m=3, 4, 5 . . . , 20).

In basic lens data and expression data, a degree is used as a unit of an angle, and mm is used as a unit of a length, but since the optical system can be used with magnification and reduction in proportion, appropriate different units may be used.

TABLE 16

| Surface Number | Curvature Radius | Distance | nd | vd | θgF |
|---|---|---|---|---|---|
| 1 | 118.040 | 2.45 | 1.69680 | 55.5 | |
| 2 | 226.170 | 0.15 | | | |

TABLE 16-continued

| Surface Number | Curvature Radius | Distance | nd | vd | θgF |
|---|---|---|---|---|---|
| 3 | 39.651 | 6.20 | 1.49700 | 81.6 | |
| 4 | 122.610 | 0.15 | | | |
| 5 | 33.611 | 5.10 | 1.49700 | 81.6 | 0.5375 |
| 6 | 66.540 | 0.15 | | | |
| 7 | 24.239 | 9.93 | 1.49700 | 81.6 | |
| 8 | 33.111 | 0.75 | | | |
| 9 | 40.570 | 1.19 | 1.68893 | 31.2 | |
| 10 | 14.632 | 5.82 | | | |
| 11 | ∞ | 9.80 | | | |
| *12 | −25.211 | 4.15 | 1.80610 | 40.9 | |
| *13 | −39.046 | 0.21 | | | |
| 14 | 155.760 | 6.71 | 1.88300 | 40.8 | |
| 15 | −16.669 | 1.08 | 1.64769 | 33.8 | |
| 16 | 23.016 | 6.43 | 1.88300 | 40.8 | |
| 17 | 130.660 | 0.84 | | | |
| 18 | 83.297 | 2.12 | 2.00069 | 25.5 | |
| 19 | 248.430 | 10.00 | | | |
| 20 | ∞ | 2.80 | 1.51680 | 64.2 | |
| 21 | ∞ | | | | |

TABLE 17

| | |
|---|---|
| f | 56.74 |
| BF | 14.15 |
| 2ω | 28.2 |
| Fno | 1.25 |

TABLE 18

| Surface Number | 12 | 13 |
|---|---|---|
| K | 0.0000000E+00 | 0.0000000E+00 |
| A3 | −5.4390191E−06 | 2.0197209E−05 |
| A4 | 7.6906609E−06 | 4.6316479E−06 |
| A5 | −1.9892955E−06 | 1.2763791E−06 |
| A6 | 1.3009389E−07 | −1.0982860E−07 |
| A7 | 2.1383723E−09 | −9.4499747E−10 |
| A8 | −3.5100915E−10 | 3.6819654E−10 |
| A9 | −2.3107027E−11 | 2.2509649E−11 |
| A10 | −3.4335228E−13 | 2.7190007E−13 |
| A11 | 5.0905398E−14 | −5.8050703E−14 |
| A12 | 5.4740741E−15 | −6.2170865E−15 |
| A13 | 3.1623233E−16 | −3.8573259E−16 |
| A14 | 9.8821792E−18 | −1.6015358E−17 |
| A15 | −2.9640085E−19 | −2.0425376E−19 |
| A16 | −8.1938746E−20 | 4.2635187E−20 |
| A17 | −8.9348387E−21 | 5.9320562E−21 |
| A18 | −7.6842542E−22 | 5.4278679E−22 |
| A19 | −5.8823241E−23 | 4.2137980E−23 |
| A20 | −4.2010122E−24 | 2.9861951E−24 |

Here, it is preferable that the second lens group G2 includes at least one aspheric lens, and the aspheric lens is the lens 1 shown in FIGS. 1 and 2. In the second lens group G2, it is possible to reduce the fluctuation in the shape of the blurriness of the ring zone during focusing. In the lens data of Table 16, the lens L21 of the second lens group G2 having aspheric optical surfaces indicated by the surface number 12 and the surface number 13 is composed of the lens 1.

As described above, the lens disclosed in the present specification has random unevenness within an optical effective diameter of an optical surface, in which an arithmetic mean roughness within the optical effective diameter of the optical surface is 20 nm or more and 50 nm or less, and an average value of widths of protrusion portions of the unevenness on an average line of a roughness curve of the optical surface is 1/200 or more and 1/50 or less of the optical effective diameter of the optical surface.

Further, the standard deviation of the widths of the protrusion portions is less than 1/125 of the optical effective diameter of the optical surface.

Furthermore, the arithmetic mean roughness within the optical effective diameter of the optical surface is 20 nm or more and 30 nm or less, and an average value of widths of protrusion portions of the unevenness on an average line of a roughness curve of the optical surface is 1/100 or more and 1/50 or less of the optical effective diameter of the optical surface.

In addition, the optical surface is aspheric.

The zoom lens disclosed in the present specification consists of, in order from an object side, a first stationary lens group that has a positive refractive power and is stationary with respect to an image plane during zooming, a plurality of moving lens groups that move independently of each other during zooming, and a second stationary lens group that is positioned closest to an image side, has a positive refractive power, and is stationary with respect to the image plane during zooming, in which the moving lens group includes at least one aspheric lens, and the aspheric lens is the lens.

The zoom lens disclosed in the present specification consists of, in order from an object side, a first stationary lens group that has a positive refractive power and is stationary with respect to an image plane during zooming, a plurality of moving lens groups that move independently of each other during zooming, and a second stationary lens group that is positioned closest to an image side, has a positive refractive power, and is stationary with respect to the image plane during zooming, in which one or both of the first stationary lens group and the second stationary lens group includes at least one aspheric lens, and the aspheric lens is the lens.

Furthermore, the imaging lens disclosed in the present specification consists of, in order from an object side, a first lens group, a stop, and a second lens group having a positive refractive power, the first lens group being stationary with respect to an image plane during focus adjustment from an object at infinity to a close-range object, in which the second lens group includes at least one aspheric lens, and the aspheric lens is the lens.

EXPLANATION OF REFERENCES

1: lens
2: optical surface
3: protrusion portion
C1: roughness curve
C2: average line
D: optical effective diameter
W: width of protrusion portion
10: zoom lens
G1: first lens group
G2: second lens group
G3: third lens group
G4: fourth lens group
G5: fifth lens group
L1a to L1j: lens
L2a: lens
L3a to L3e: lens
L4a, L4b: lens
L5a to L51: lens
PP1, PP2: optical member
St: aperture stop
Sim: image plane
wa: on-axis rays
wb: rays at maximum angle of view
Z: optical axis
20: zoom lens
G1: first lens group
G2: second lens group
G3: third lens group
G4: fourth lens group
G5: fifth lens group
L11 to L15: lens
L21 to L26: lens
L31: lens
L41 to L45: lens
L51 to L62: lens
PP1 to PP3: optical member
St: aperture stop
Sim: image plane
wa: on-axis rays
wb: rays at maximum angle of view
Z: optical axis
30: zoom lens
B0w, B0t: on-axis rays
B1w, B1t: off-axis rays at maximum angle of view
G1: first lens group
G1A: front group of the first lens group
G1B: intermediate group of the first lens group
G1C: rear group of the first lens group
G2: second lens group
G3: third lens group
G4: fourth lens group
G4A: front group of the fourth lens group
G4B: rear group of the fourth lens group
G5: fifth lens group
LA1 to LA4: lens
LB1: lens
LC1 to LC6: lens
P1 to P3: optical member
St: aperture stop
Sim: image plane
Z: optical axis
40: zoom lens
G1: first lens group
G1a: front group of the first lens group
G1b: intermediate group of the first lens group
G1c: rear group of the first lens group
G2: second lens group
G3: third lens group
G4: fourth lens group
G5: fifth lens group
L1a to L1j: lens
L2a to L2d: lens
L3a to L3c: lens
L4a to L4c: lens
L5a to L5o: lens
PP1, PP2: optical member
St: aperture stop
Sim: image plane
wa: on-axis rays
wb: rays at maximum angle of view
Z: optical axis
50: imaging lens
G1: first lens group
G2: second lens group
L11 to L15: lens
L21 to L25: lens
PP: optical member
St: stop
Sim: image plane
Z: optical axis

What is claimed is:

1. A lens, comprising:
unevenness within an optical effective diameter of an optical surface,
wherein an arithmetic mean roughness within the optical effective diameter of the optical surface is 20 nm or more and 50 mn or less, and
an average value of widths of protrusion portions of the unevenness on an average line of a roughness curve of the optical surface is 1/200 or more and 1/50 or less of the optical effective diameter of the optical surface.

2. The lens according to claim 1,
wherein a standard deviation of the widths of the protrusion portions is less than 1/125 of the optical effective diameter of the optical surface.

3. The lens according to claim 1,
wherein the arithmetic mean roughness within the optical effective diameter of the optical surface is 20 nm or more and 30 nm or less, and
the average value of the widths of the protrusion portions of the unevenness on the average line of the roughness curve of the optical surface is 1/100 or more and 1/50 or less of the optical effective diameter of the optical surface.

4. The lens according to claim 2,
wherein the arithmetic mean roughness within the optical effective diameter of the optical surface is 20 nm or more and 30 nm or less, and
the average value of the widths of the protrusion portions of the unevenness on the average line of the roughness curve of the optical surface is 1/100 or more and 1/50 or less of the optical effective diameter of the optical surface.

5. The lens according to claim 1,
wherein the optical surface is aspheric.

6. The lens according to claim 2,
wherein the optical surface is aspheric.

7. The lens according to claim 3,
wherein the optical surface is aspheric.

8. The lens according to claim 4,
wherein the optical surface is aspheric.

9. A zoom lens consisting of, in order from an object side:
a first stationary lens group that has a positive refractive power and is stationary with respect to an image plane during zooming;
a plurality of moving lens groups that move independently of each other during zooming; and
a second stationary lens group that is positioned closest to an image side, has a positive refractive power, and is stationary with respect to the image plane during zooming,
wherein at least one of the plurality of moving lens groups includes at least one aspheric lens, and the aspheric lens is the lens according to claim 5.

10. A zoom lens consisting of, in order from an object side:
a first stationary lens group that has a positive refractive power and is stationary with respect to an image plane during zooming;
a plurality of moving lens groups that move independently of each other during zooming; and
a second stationary lens group that is positioned closest to an image side, has a positive refractive power, and is stationary with respect to the image plane during zooming,
wherein at least one of the plurality of moving lens groups includes at least one aspheric lens, and the aspheric lens is the lens according to claim 6.

11. The zoom lens according to claim 9,
wherein the plurality of moving lens groups include in order from the object side, a negative moving lens group having a negative refractive power, a first positive lens group having a positive refractive power, and a second positive lens group having a positive refractive power.

12. The zoom lens according to claim 11,
wherein the first positive lens group or the second positive lens group includes the aspheric lens.

13. A zoom lens consisting of, in order from an object side:
a first stationary lens group that has a positive refractive power and is stationary with respect to an image plane during zooming;
a plurality of moving lens groups that move independently of each other during zooming; and
a second stationary lens group that is positioned closest to an image side, has a positive refractive power, and is stationary with respect to the image plane during zooming,
wherein one or both of the first stationary lens group and the second stationary lens group include at least one aspheric lens, and the aspheric lens is the lens according to claim 5.

14. A zoom lens consisting of, in order from an object side:
a first stationary lens group that has a positive refractive power and is stationary with respect to an image plane during zooming;
a plurality of moving lens groups that move independently of each other during zooming; and
a second stationary lens group that is positioned closest to an image side, has a positive refractive power, and is stationary with respect to the image plane during zooming,
wherein one or both of the first stationary lens group and the second stationary lens group include at least one aspheric lens, and the aspheric lens is the lens according to claim 6.

15. A zoom lens consisting of, in order from an object side:
a first stationary lens group that has a positive refractive power and is stationary with respect to an image plane during zooming;
a plurality of moving lens groups that move independently of each other during zooming; and
a second stationary lens group that is positioned closest to an image side, has a positive refractive power, and is stationary with respect to the image plane during zooming,
wherein one or both of the first stationary lens group and the second stationary lens group include at least one aspheric lens, and the aspheric lens is the lens according to claim 7.

16. A zoom lens consisting of, in order from an object side:
a first stationary lens group that has a positive refractive power and is stationary with respect to an image plane during zooming;
a plurality of moving lens groups that move independently of each other during zooming; and a second stationary lens group that is positioned closest to an image side, has a positive refractive power, and is stationary with respect to the image plane during zooming, wherein one or both of the first stationary lens group and the second stationary lens group include at least one aspheric lens, and the aspheric lens is the lens according to claim 8.

17. An imaging lens, consisting of, in order from an object side:
    a first lens group;
    a stop; and
    a second lens group having a positive refractive power,
    wherein the first lens group is stationary with respect to an image plane during focus adjustment from an object at infinity to a close-range object, and
    the second lens group includes at least one aspheric lens, and the aspheric lens is the lens according to claim 5.

18. An imaging lens, consisting of, in order from an object side:
    a first lens group;
    a stop; and
    a second lens group having a positive refractive power,
    wherein the first lens group is stationary with respect to an image plane during focus adjustment from an object at infinity to a close-range object, and
    the second lens group includes at least one aspheric lens, and the aspheric lens is the lens according to claim 6.

19. An imaging lens, consisting of, in order from an object side:
    a first lens group;
    a stop; and
    a second lens group having a positive refractive power,
    wherein the first lens group is stationary with respect to an image plane during focus adjustment from an object at infinity to a close-range object, and
    the second lens group includes at least one aspheric lens, and the aspheric lens is the lens according to claim 7.

20. An imaging lens, consisting of, in order from an object side:
    a first lens group;
    a stop; and
    a second lens group having a positive refractive power,
    wherein the first lens group is stationary with respect to an image plane during focus adjustment from an object at infinity to a close-range object, and
    the second lens group includes at least one aspheric lens, and the aspheric lens is the lens according to claim 8.

* * * * *